(12) United States Patent
Takahashi et al.

(10) Patent No.: US 8,087,376 B2
(45) Date of Patent: Jan. 3, 2012

(54) COATING APPARATUS

(75) Inventors: Naoto Takahashi, Shunan (JP); Atsuyuki Kohno, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 792 days.

(21) Appl. No.: 12/084,407

(22) PCT Filed: Oct. 26, 2006

(86) PCT No.: PCT/JP2006/321923
§ 371 (c)(1),
(2), (4) Date: Sep. 2, 2008

(87) PCT Pub. No.: WO2007/052732
PCT Pub. Date: May 10, 2007

(65) Prior Publication Data
US 2009/0133624 A1 May 28, 2009

(30) Foreign Application Priority Data
Nov. 2, 2005 (JP) .................... 2005-319567

(51) Int. Cl.
*B05C 5/02* (2006.01)
(52) U.S. Cl. ............. 118/66; 118/58; 118/323; 118/712
(58) Field of Classification Search .............. 118/58, 118/66, 323, 712; 427/164, 165
See application file for complete search history.

(56) References Cited

U.S. PATENT DOCUMENTS

| 5,411,588 A * | 5/1995 | Diepens et al. ............... 118/666 |
| 5,820,673 A * | 10/1998 | Sentilles et al. ............... 118/319 |
| 2002/0037366 A1 | 3/2002 | Arioka |

FOREIGN PATENT DOCUMENTS

| JP | 62-62541 A | 3/1987 |
| JP | 6-142594 A | 5/1994 |
| JP | 11-99354 A | 4/1999 |
| JP | 2004-17004 A | 1/2004 |
| JP | 2004-50108 A | 2/2004 |
| JP | 2005-13873 A | 1/2005 |
| JP | 2005-218994 A | 8/2005 |
| JP | 2005-243138 A | 9/2005 |
| JP | 2005-246266 A | 9/2005 |

* cited by examiner

*Primary Examiner* — Laura Edwards
(74) *Attorney, Agent, or Firm* — Birch, Stewart, Kolasch & Birch, LLP

(57) ABSTRACT

The present invention has as an object to provide a coating apparatus for forming a coating film on each of many lenses in a short time. To attain this object, in the coating apparatus for a lens according to the invention, a lens support portion of a lens centering device, a lens support portion of a lens spinning device, and a lens support portion of a lens drying device are arranged at equal distances. A pair of lens holding portions of a lens transport device are provided at the same distance as the distance between the lens support portions. The first lens holding portion of the lens holding portions transports the lens from the lens support portion of the centering device to the lens support portion of the applicator device, and the second lens holding portion of the lens holding portions simultaneously transports the lens from the lens support portion of the applicator device to the lens support portion of the drying device.

7 Claims, 23 Drawing Sheets

Fig. 22
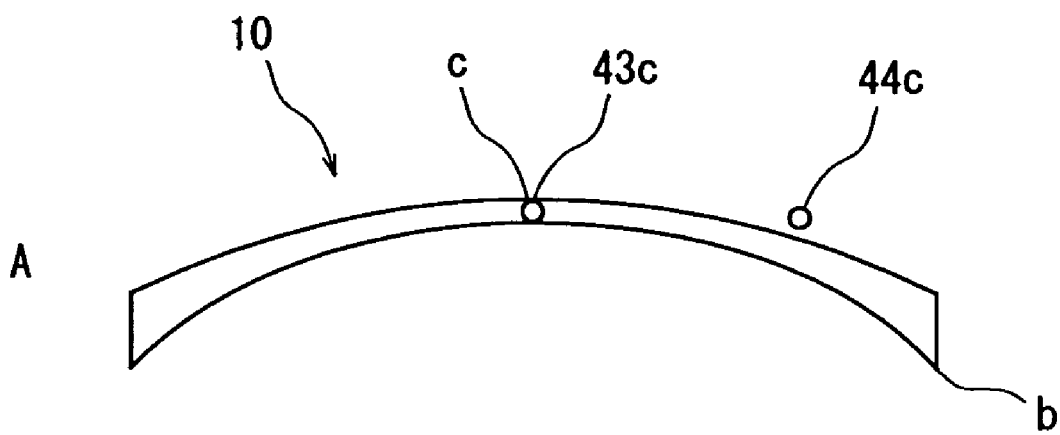
A
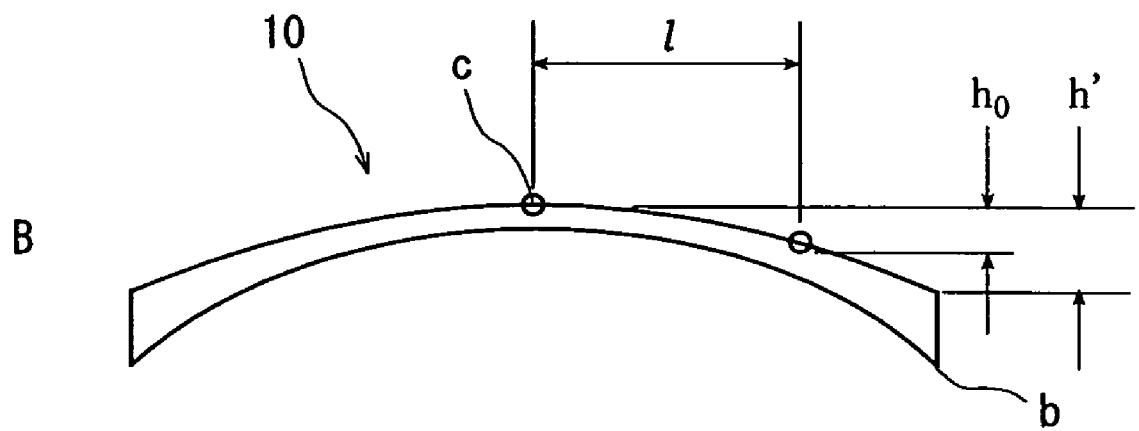
B
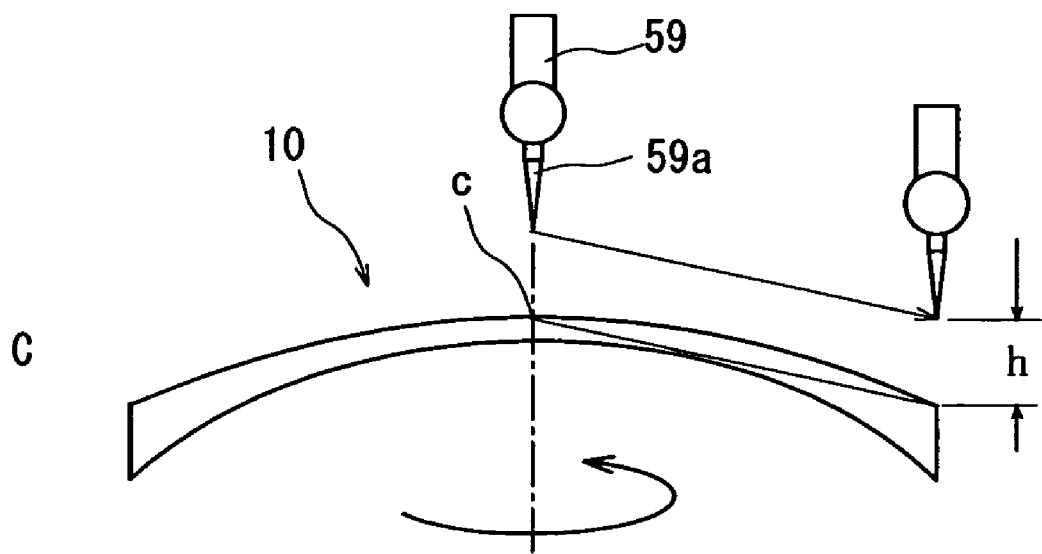
C

COATING APPARATUS

TECHNICAL FIELD

This invention relates to a coating apparatus for applying a coating fluid for primer coating onto lenses for spectacles, for example, before photochromic coating is performed.

BACKGROUND ART

Among materials which change in color when exposed to light is a photochromic substance. The photochromic substance has the property that its structure reversibly changes according to the presence or absence of ultraviolet radiation to change in absorption spectrum. This property results from the nature that when an isomer is irradiated with light of a particular wavelength, the single chemical substance, under the action of light, reversibly produces an isomer having a different absorption spectrum. The resulting different isomer is restored to the color of the original isomer by heat or light of a different wavelength.

Photochromic spectacles utilize the above nature of the photochromic material for lenses. In an outdoor environment exposed to light including ultraviolet radiation, such as sunlight, the lenses are rapidly colored to function as sunglasses. In an indoor environment without exposure to light, the lenses fade to function as ordinary transparent spectacles.

Known methods for producing a lens having photochromic property include a method of impregnating the surface of a non-photochromic lens with a photochromic coating fluid; a method dissolving a photochromic coating fluid in a monomer, and polymerizing the solution to obtain a photochromic lens directly; and a method providing a layer having photochromism on the surface of a lens with the use of a coating agent containing a photochromic compound.

In connection with the present invention, the technology of Japanese Unexamined Patent Publication No. 2000-334369 is available as an apparatus which can coat a plurality of lenses continuously, and the technology of Japanese Unexamined Patent Publication No. 2005-013873 is available as an apparatus equipped with an auxiliary mechanism for spreading a coating fluid on a lens with the use of a flexible film.

Of the above-described methods for producing a lens, the coating method, which coats a photochromic coating fluid, may carry out primer coating on the surface of a lens as pretreatment for a photochromic coating operation, in order to improve adhesion between a photochromic layer and a lens base material, and then perform photochromic coating.

In this primer coating operation, a primer coating fluid is ejected from the nozzle of a vessel or barrel containing the primer coating fluid to the surface of the lens, with the lens being rotated, to form a coating layer on the surface of the lens.

No problem is posed if lenses to be coated are same type which means size and gradient of lenses are identical, because the setting for the apparatus remains unchanged. However, if the coating fluid is to be applied to lenses different in size and gradient, it is necessary to adapt the apparatus to the shape of the lens. In this case, if the height or gradient of the lens is known beforehand, the setting of the apparatus can be adapted to their pattern. If the height or gradient of the lens is unknown, it is common practice to investigate the height or gradient of the lens anew, and then adjust the height of the lens or the height of the nozzle in accordance with a position suited to the lens, thereby rendering the coating layer uniform. In coating the lens, it is desired to coat many lenses in a short time with good efficiency.

The present invention has been accomplished in the light of such circumstances. It is an object of the invention to provide a coating apparatus which can detect the height and gradient of a lens automatically and easily, which forms a stable coating film, and which forms a coating film on each of many lenses in a short time.

DISCLOSURE OF THE INVENTION

A coating apparatus, as a first aspect of the present invention, for attaining the above object, is a coating apparatus for a lens, comprising a centering device for determining a center of a lens (2); a spinning device for rotating a lens (3); an applicator device (5) comprising a nozzle for discharging a coating fluid for applying the coating fluid onto the surface of the lens held at the spinning device; a drying device (7) for drying the coating fluid on the surface of the lens; and a lens transport device (8) for transporting the lens from the centering device to the spinning device, and further transporting the lens from the spinning device to the drying device, wherein each of the centering device and the spinning device has a lens support portion (18,34), the drying device has plural of lens support portions (62), the lens transport device has a pair of lens support portions (80,81); the lens support portion (18) of the centering device, the lens support portion (34) of the spinning device, one of lens support portions (62) of the drying device, and a pair of lens support portions (80, 81) of the lens transport device are arranged such that these all lens support portions are being located on an identical line and also that the distance (L1) between a pair of lens holding portions of the transport device, the distance (L2) between the lens support portion of the centering device and the lens support portion of the spinning device, and the distance (L3) between the lens support portion of the spinning device and the lens support portion of the drying device are being the same; a first lens support portion of the transport device transports the lens from the lens support portion of the centering device to the lens support portion of the spinning device; and a second lens support portion of the transport device simultaneously transports the lens from the lens support portion of the spinning device to the lens support portion of the drying device. In the above mentioned coating apparatus, number symbols or marks in parentheses are corresponding to number symbols or marks in figures described below.

In the coating apparatus, as a second aspect of the present invention, a lens height measuring sensor is provided for detecting a height difference between a height at the center of the lens and a height at other point on the lens surface spaced from the center.

In the coating apparatus, as a third aspect of the present invention, the lens height measuring sensor is equipped with two sets of light emitters and light receivers, and determines the height of the lens by allowing the lens to block light emitted from the light emitter and reaching the light receiver.

In the coating apparatus, as a fourth aspect of the present invention, the coating fluid is coated to the surface of the rotating lens while the nozzle is being moved at a distance from, and along, a straight line connecting the center of the surface of the lens to an edge portion of the surface of the lens.

In the coating apparatus, as a fifth aspect of the present invention, the drying device is a turntable rotatable on an axis of rotation, and a plurality of the lens support portions of the drying device are provided on the turntable to dry a plurality of the lenses.

In the coating apparatus, as a sixth aspect of the present invention, a waiting tank storing a solvent is provided for the nozzle, and the tip of the nozzle is dipped in the waiting tank when the applicator device is not in operation.

In the coating apparatus, as a seventh aspect of the present invention, an operation for applying the coating fluid onto the lens can be a primer coating operation to be performed before photochromic coating of the lens.

BRIEF DESCRIPTION OF THE DRAWINGS

FIG. 22A is a sectional view of a state in which the height of a lens is measured with laser light from the lens height measuring sensor shown in FIG. 11.
FIG. 22B is a sectional view for illustrating how to lead to the edge position of the lens.
FIG. 22C is a sectional view of a state in which a coating fluid is applied to the lens by the nozzle of the vessel.

BEST MODE FOR CARRYING OUT THE INVENTION

A coating apparatus according to the embodiment of the present invention will now be described with reference to the accompanying drawings.

Figure 1:
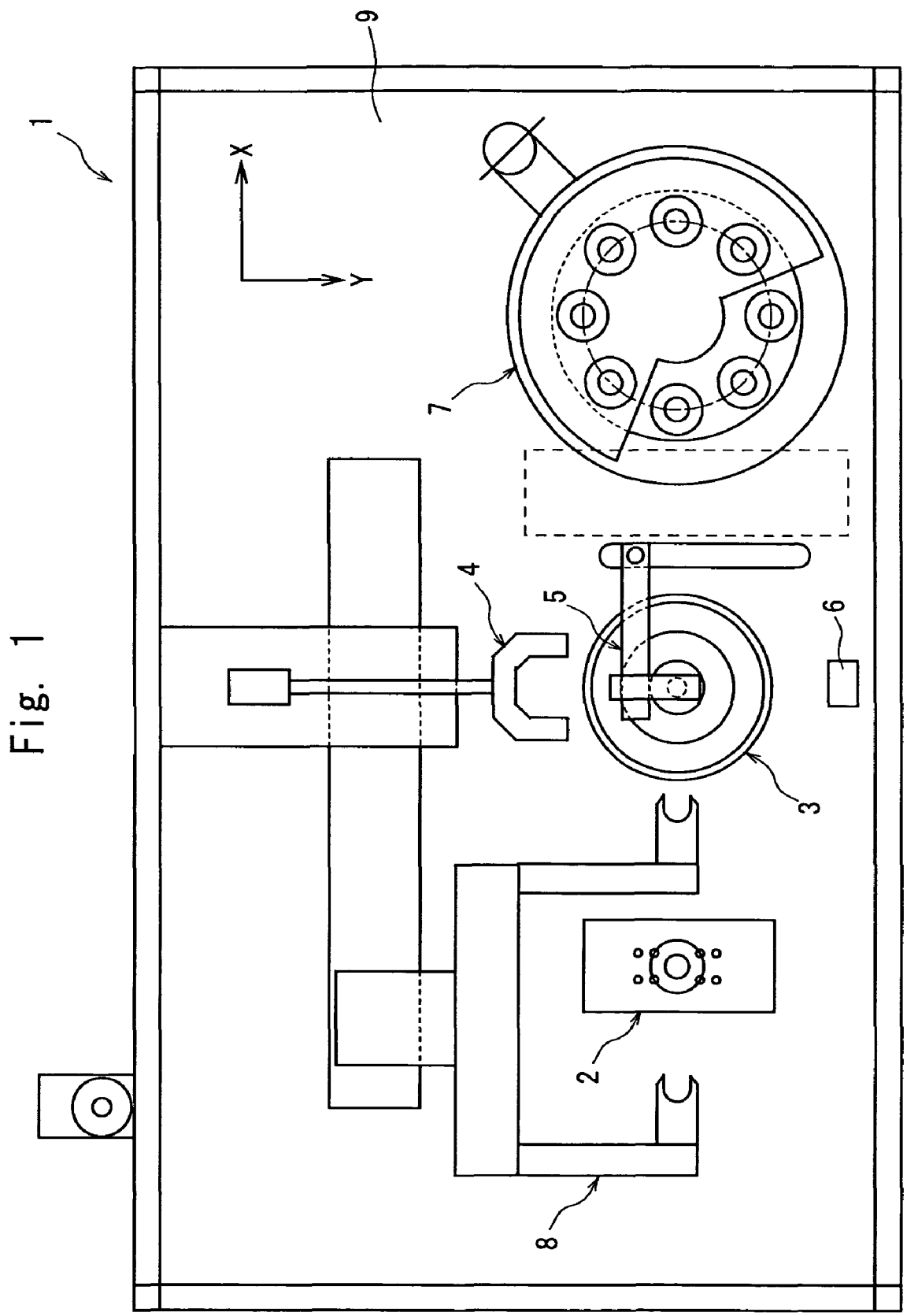
FIG. 1 is a plan view of a coating apparatus according to an embodiment of the present invention.

FIG. 1 shows a primer coating apparatus for coating a primer solution onto a lens under automatic control (the primer coating apparatus will be hereinafter referred to as the coating apparatus). The lower side of the photochromic coating apparatus in FIG. 1 is the front side of the apparatus (in the Y-axis direction), the right-to-left side of the apparatus is in the lateral direction (X-axis direction), and the direction perpendicular to the drawing (sheet face) is the up-and-down direction (Z-axis direction).

A coating apparatus 1 is equipped with a centering device 2 for determining, mainly, the central position of a lens, a spinning device 3 for rotating the lens, a lens height measuring sensor 4 for measuring the height and gradient of the lens, an applicator device 5 for applying a coating fluid to the surface of the lens, a nozzle waiting tank 6 for dipping the tip of a nozzle of the applicator device in a solvent when the nozzle is not in operation, a lens drying device 7 for drying the coating fluid on the surface of the lens, and a lens transport device 8.

Figure 2:
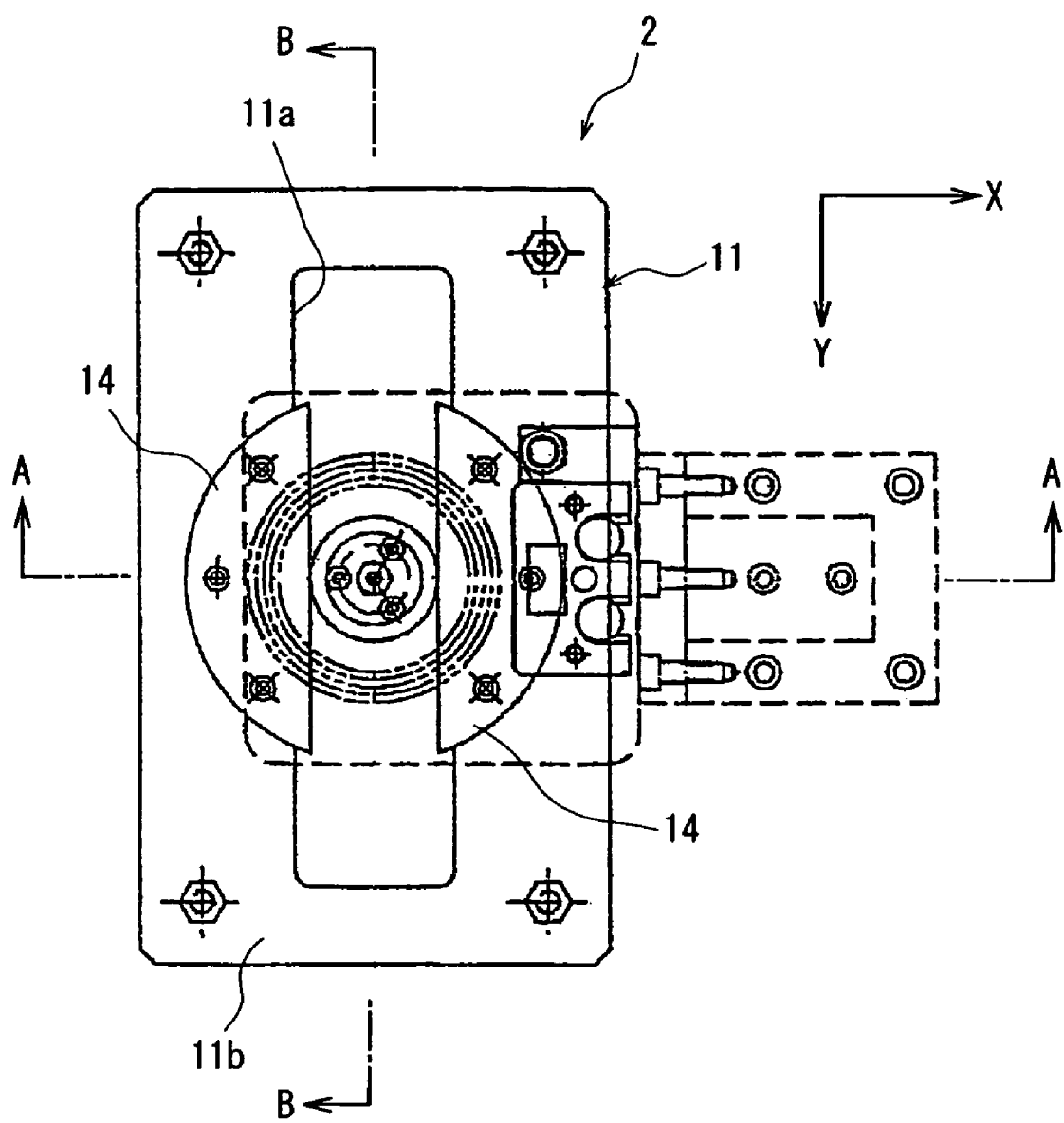
FIG. 2 is a plan view of a centering device provided in the coating apparatus of FIG. 1.
Figure 3:
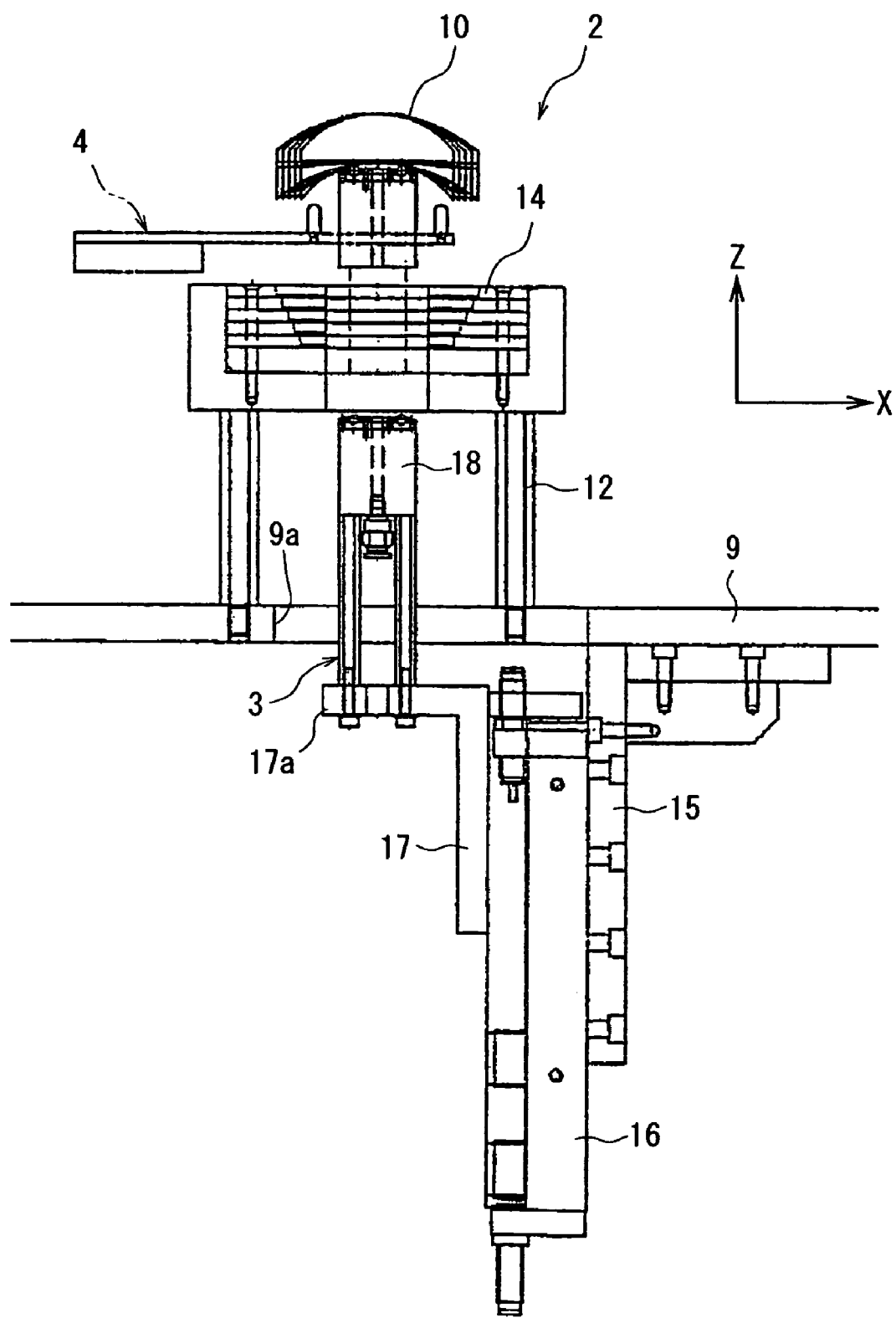
FIG. 3 is a sectional view taken on line A-A in FIG. 2.

FIG. 2 is a plan view of the centering device 2, and FIG. 3 is a sectional view taken on line A-A in FIG. 2.

Figure 4:
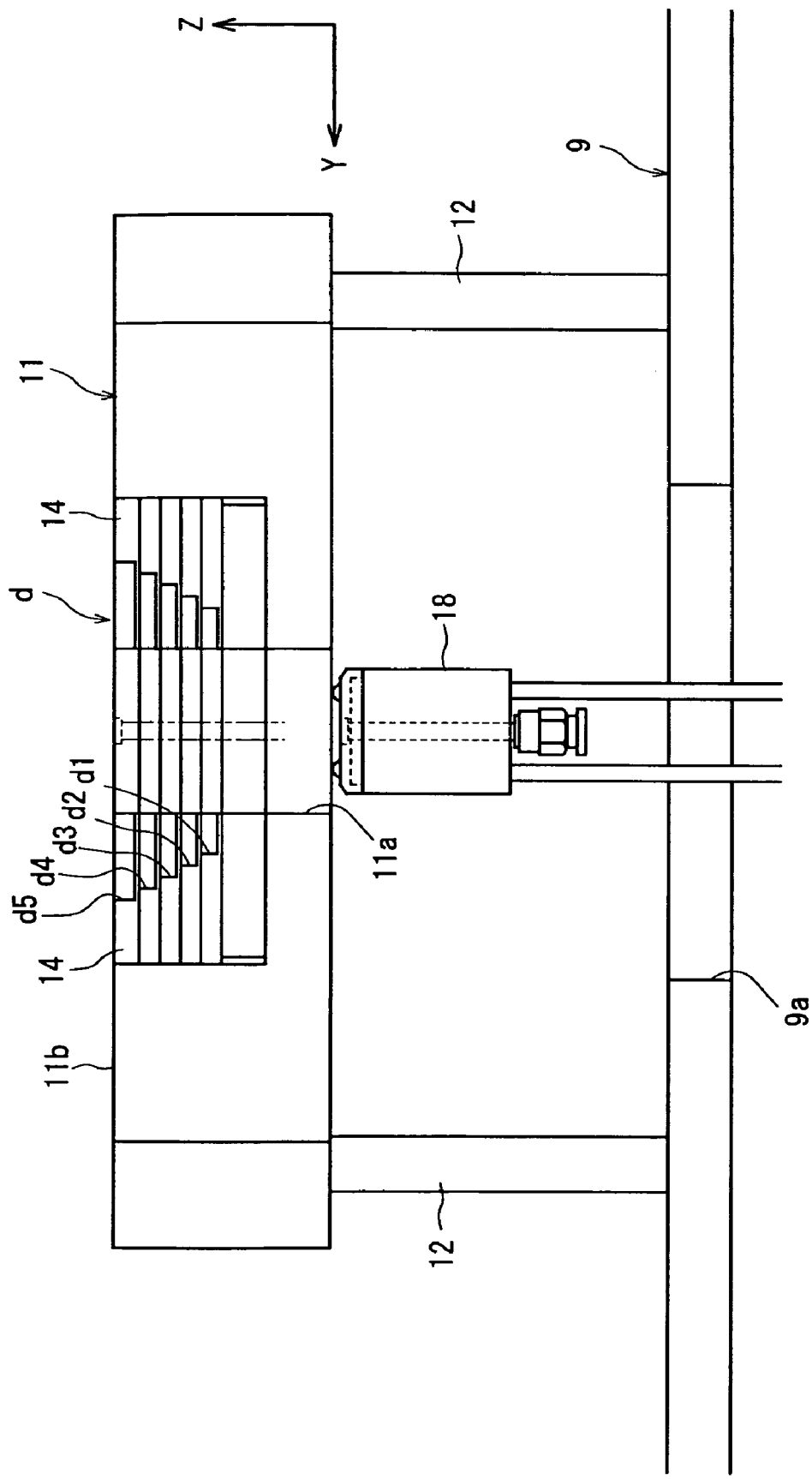
FIG. 4 is an enlarged sectional view taken on line B-B in FIG. 2.

The centering device 2 is provided with a centering jig 11 supported by a plurality of (four) struts 12 on a base stand 9 of the coating apparatus 1. The centering jig 11 has a rectangular outer peripheral shape in the horizontal direction and, in a plan view, has a pair of block plates 14, each having an arcuate curved surface, at the center of the centering jig 11. As shown in FIG. 4, a stair-shaped stepped portion d for determining the central position of a lens 10 is formed in the block plate 14. The stepped portion d comprises stepped portions d1, d2, d3, d4 and d5 formed in conformity with the outer peripheral shapes of the lenses 10 of various sizes. Plates of varying sizes are stacked (or an integrated plate may be used) as the stepped portion d1 situated at the lowermost position, and the stepped portions d2, d3, d4, and d5 situated in this order, whereby centering can be performed for each of the lenses ranging from the small-diameter lens 10 to the large-diameter lens 10. That is, a lower edge portion of the lens 10 (a back edge portion of the lens) is abutted against any of the stepped portions d1 to d5 conforming to the sizes of the respective lenses 10, whereby the central position of the lens 10 is determined. This positional determination by the centering jig 11 serves as a reference for the centering of the lens 10 in subsequent operations. At the stepped portion d of the centering jig 11, the lens 10 is placed by a handling device (not shown) or manually.

As shown in FIG. 3, a guide member 15 handing down from the ceiling surface of the base stand 9 is provided inside of the base stand 9 on the back side of the base stand 9. An air slide table 16 is fitted to the guide member 15 to be slidable in the up-and-down direction, and is adapted to slide under the air pressure of an air pressure means (not shown).

A support member 17 of an L-shaped cross section is attached to the air slide table 16, and a centering rod 18 of a circular transverse section is erected, with its leading end facing upward, on a horizontal plate 17a provided in an upper end portion of the support member 17. The central position of the centering rod 18 is in agreement with the center of the stepped portions d1 to d5. The centering rod 18 is arranged to be capable of penetrating a hole 9a formed in the base stand 9 and the centering jig 11. By operating the air slide table 16, the lens 10 set in the centering jig 11 is supported by the leading end portion of the centering rod 18, whereby the lens 10 can be moved upwardly of an upper surface 11b of the centering jig 11. Therefore the centering rod 18 works as a lens support portion of the centering device 2.

Figure 5:
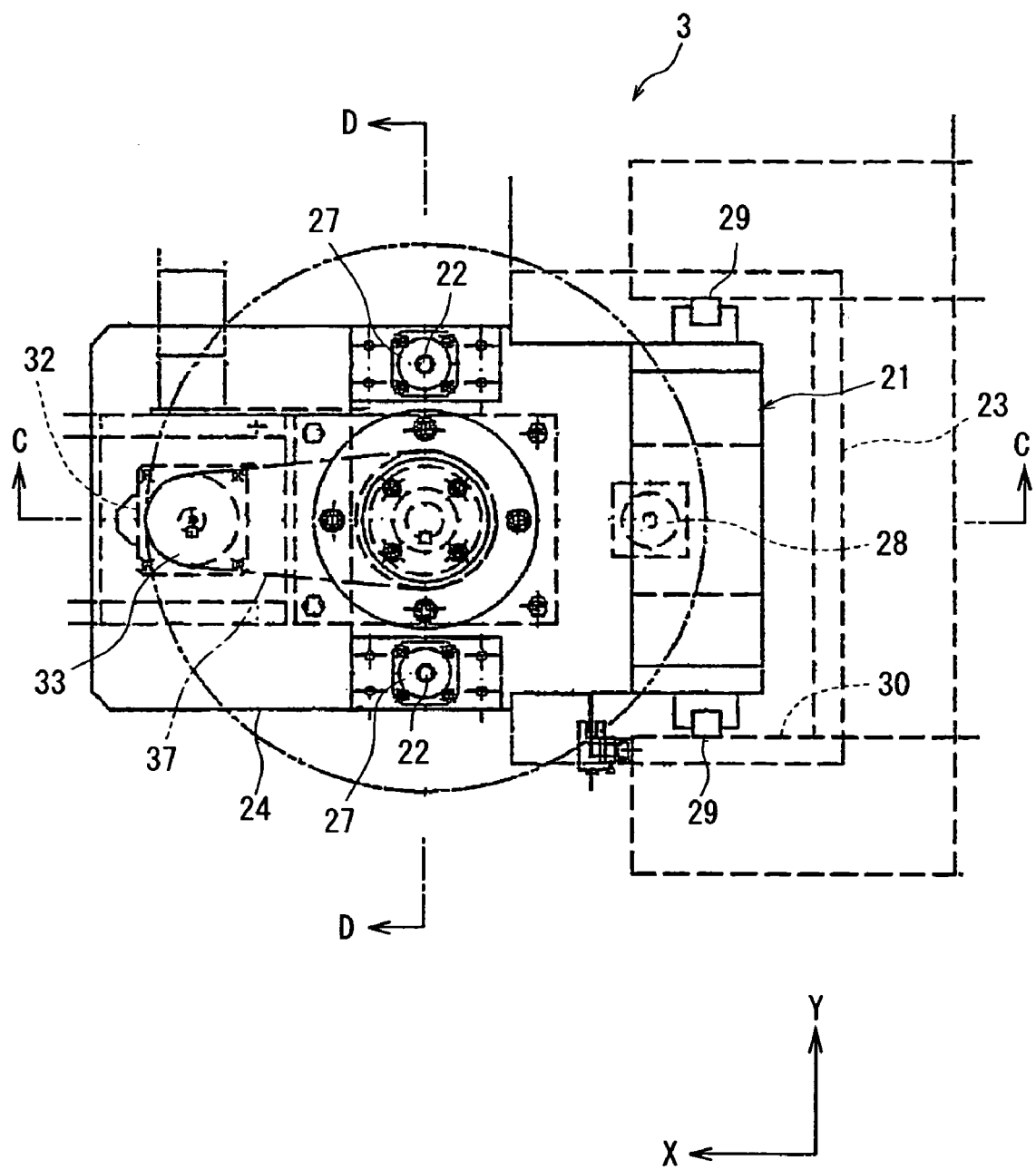
FIG. 5 is a plan view of a spinning device provided in the coating apparatus of FIG. 1.
Figure 6:
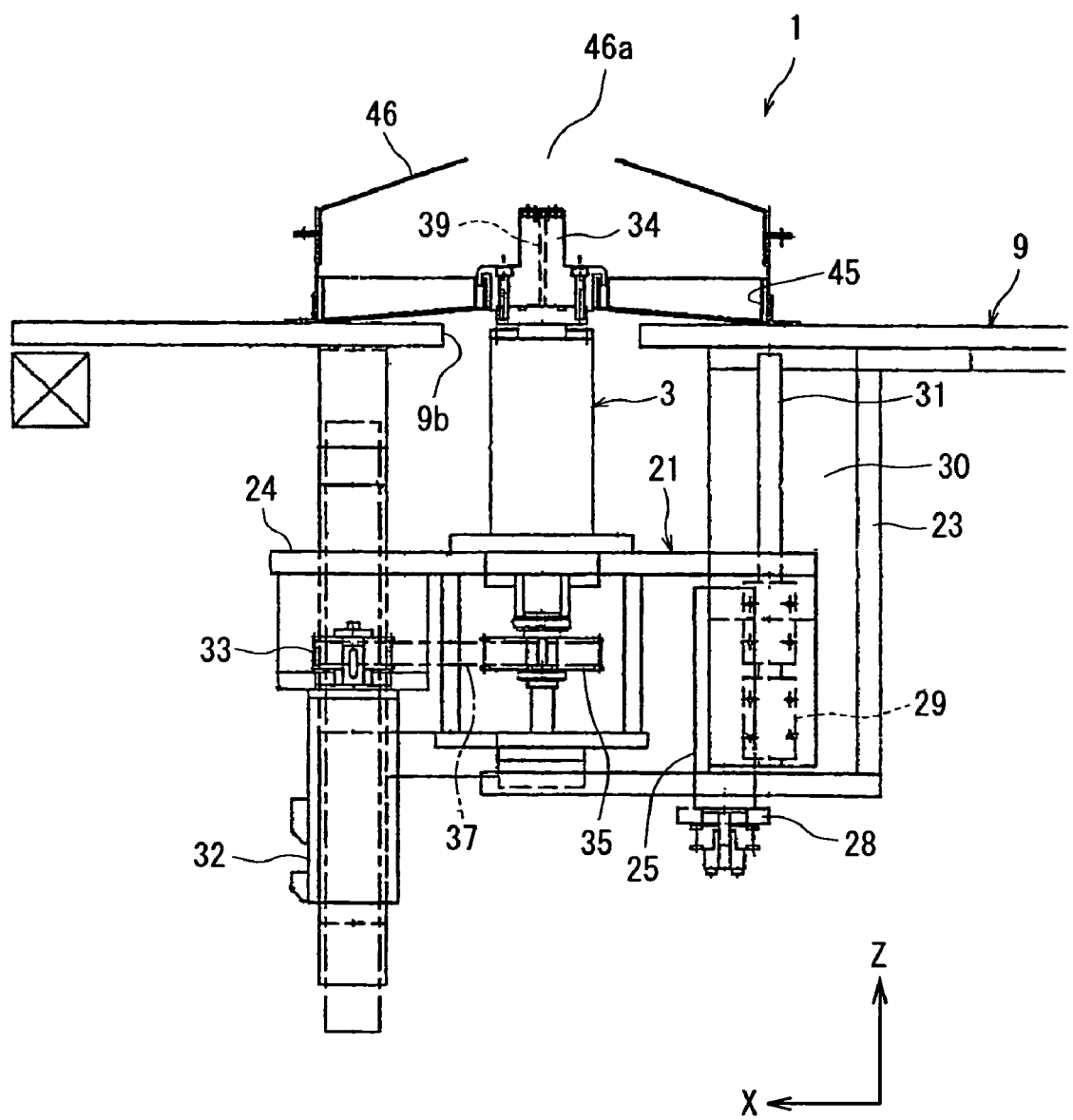
FIG. 6 is a sectional view taken on line C-C in FIG. 5.

FIG. 5 is a plan view of the spinning device 3, and FIG. 6 is a sectional view of the spinning device 3 as viewed from the X-axis direction of the coating apparatus 1.

An elevating unit 21 of the spinning device 3 is disposed in the interior of the base stand 9. The elevating unit 21 is provided with a fixed-side support plate 23 fixed on the side of the base stand 9, and two ball screws 22 (see FIGS. 5 and 8)

are fixed in the vertical direction between the top wall of the base stand 9 and the fixed-side support plate 23. An elevating block 24 having ball nuts meshes with the ball screws 22.

Figure 8:
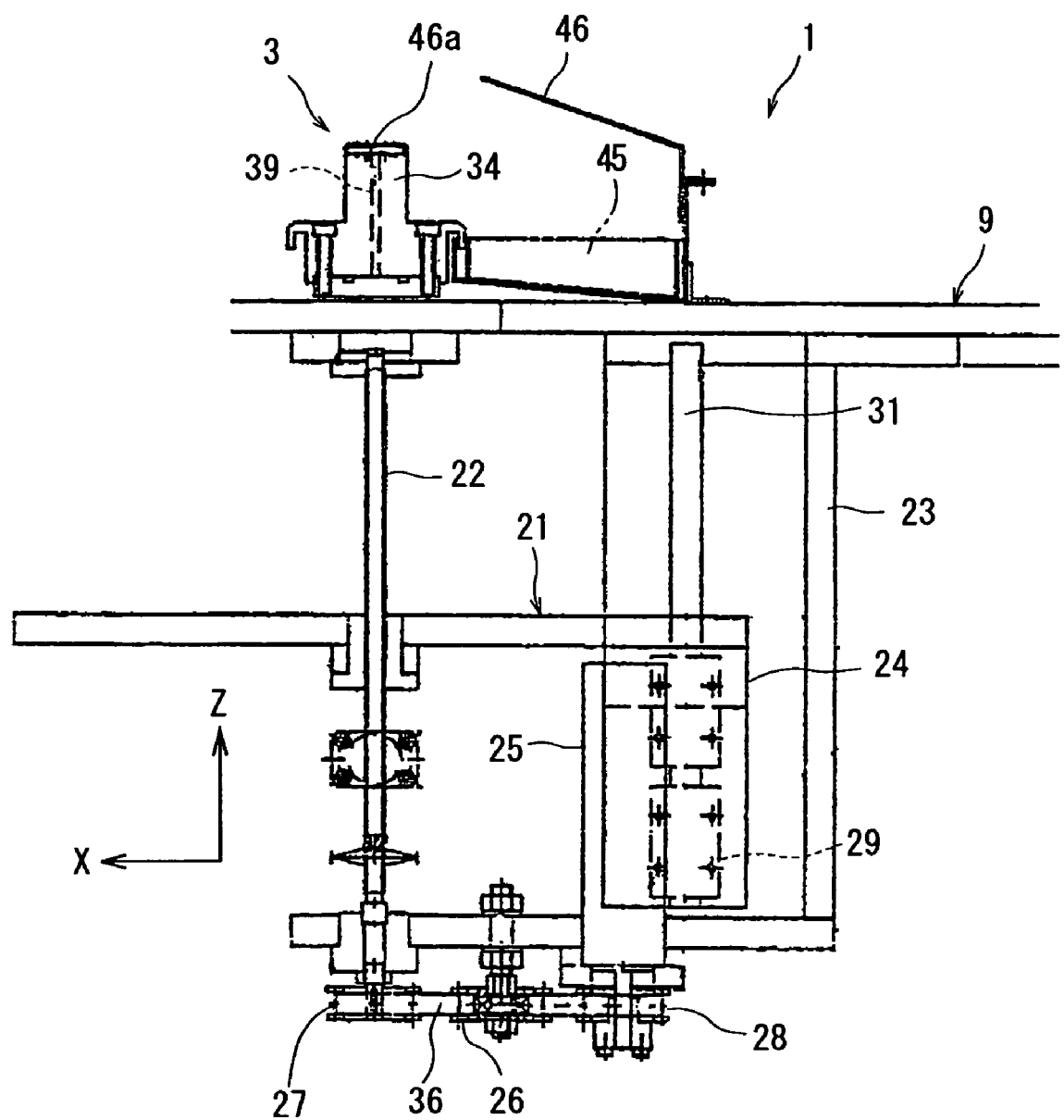
FIG. 8 is a sectional view showing a ball screw of the coating apparatus of FIG. 5.
Figure 9:
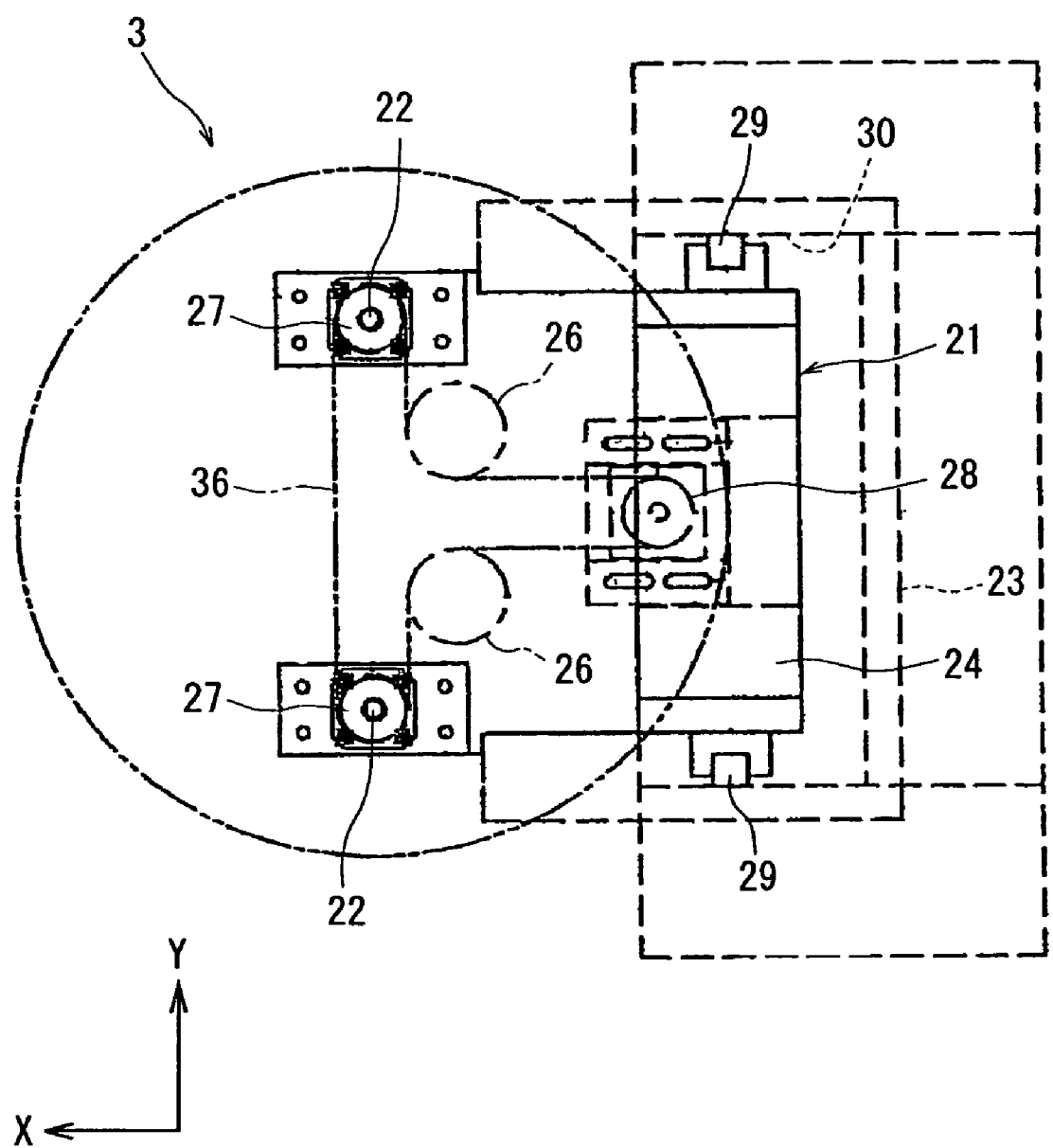
FIG. 9 is a plan view showing a timing belt looped over each pulley of the spinning device of FIG. 5.

As shown in FIG. 8, a servo motor 25 is mounted on the fixed-side support plate 23, and a drive pulley 28 is provided in the servo motor 25. As shown in FIG. 9, a pair of idler pulleys 26 are mounted on a lower portion of the fixed-side support plate 23, and a timing pulley 27 is mounted on a lower portion of the ball screw 22. A timing belt 36 is looped over the respective pulleys 26 to 28, and the elevating block 24 can be raised and lowered by driving the servo motor 25. As shown in FIGS. 5 and 9, the elevating block 24 is provided with guide rollers 29, and the guide rollers 29 are guided by roller guides 31 formed in a side wall 30 disposed below the base stand 9.

Figure 10:
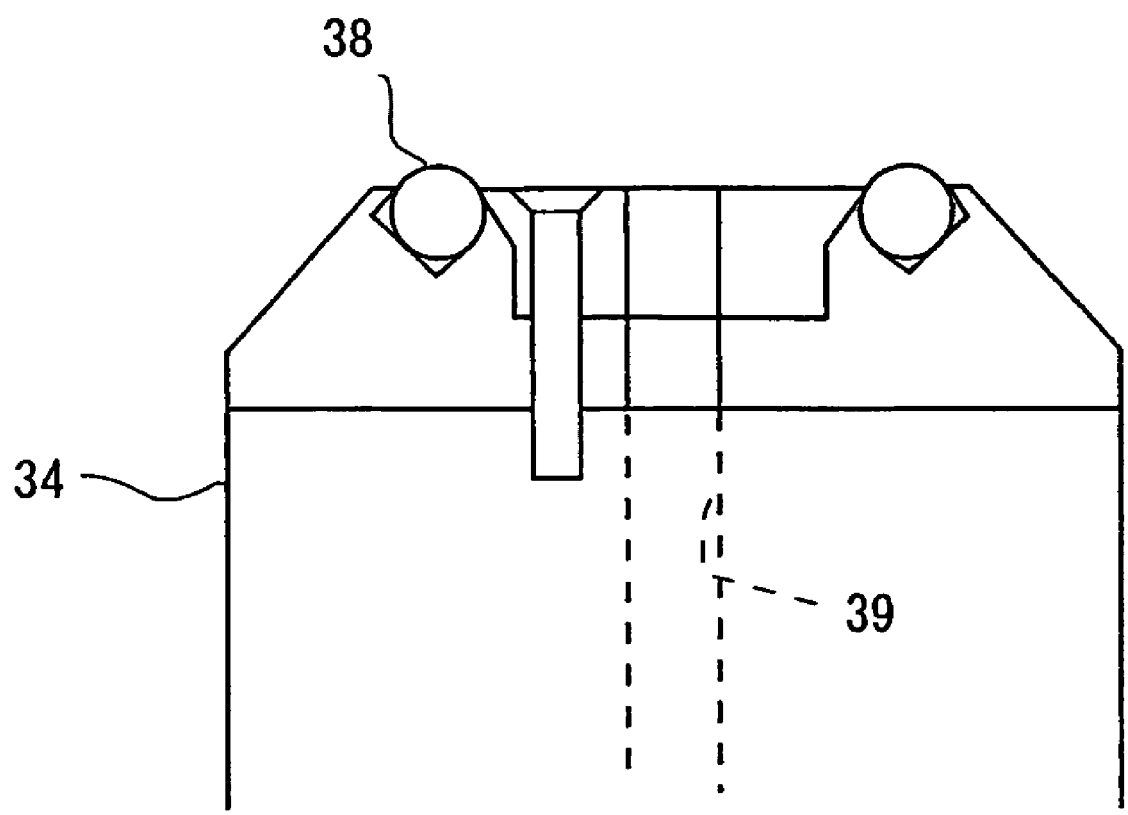
FIG. 10 is a sectional view showing an upper portion of a spinning shaft of the spinning device of FIG. 5.

As shown in FIG. 5, the elevating block 24 is provided with a servo motor 32, and a rotating pulley 33 is mounted on the servo motor 32. A spinning shaft 34 is disposed, with its axis pointing in the up-and-down direction, in the elevating block 24, and a spinning pulley 35 is mounted on the lower end of the spinning shaft 34. A timing belt 37 is looped between the pulleys 33 and 35 to render the spinning shaft 34 rotatable. An O-ring 38 is mounted in an upper end portion of the spinning shaft 34, as shown in FIG. 10. An attraction hole 39 is provided in a central portion of the spinning shaft 34, and the attraction hole 39 is connected to an air suction means (not shown) to be capable of attracting the lens 10 by suction. Therefore the spinning shaft 34 works as a lens support portion of the spinning device 3.

A recovery tray 45 for the coating fluid is placed on the base stand 9 so as to close a circular hole 9b formed in the base stand 9. A cover 46 for covering the surroundings of the spinning shaft 34 is disposed above the recovery tray 45. An opening 46a for introducing and withdrawing the lens 10 is formed in a central portion of the cover 46 beside which the spinning shaft 34 is located. The cover 46 plays roles in preventing scatter of the coating fluid to the surroundings and recovering the coating fluid into the recovery tray 45 when the lens 10 coated with the coating fluid is rotated.

Figure 11:
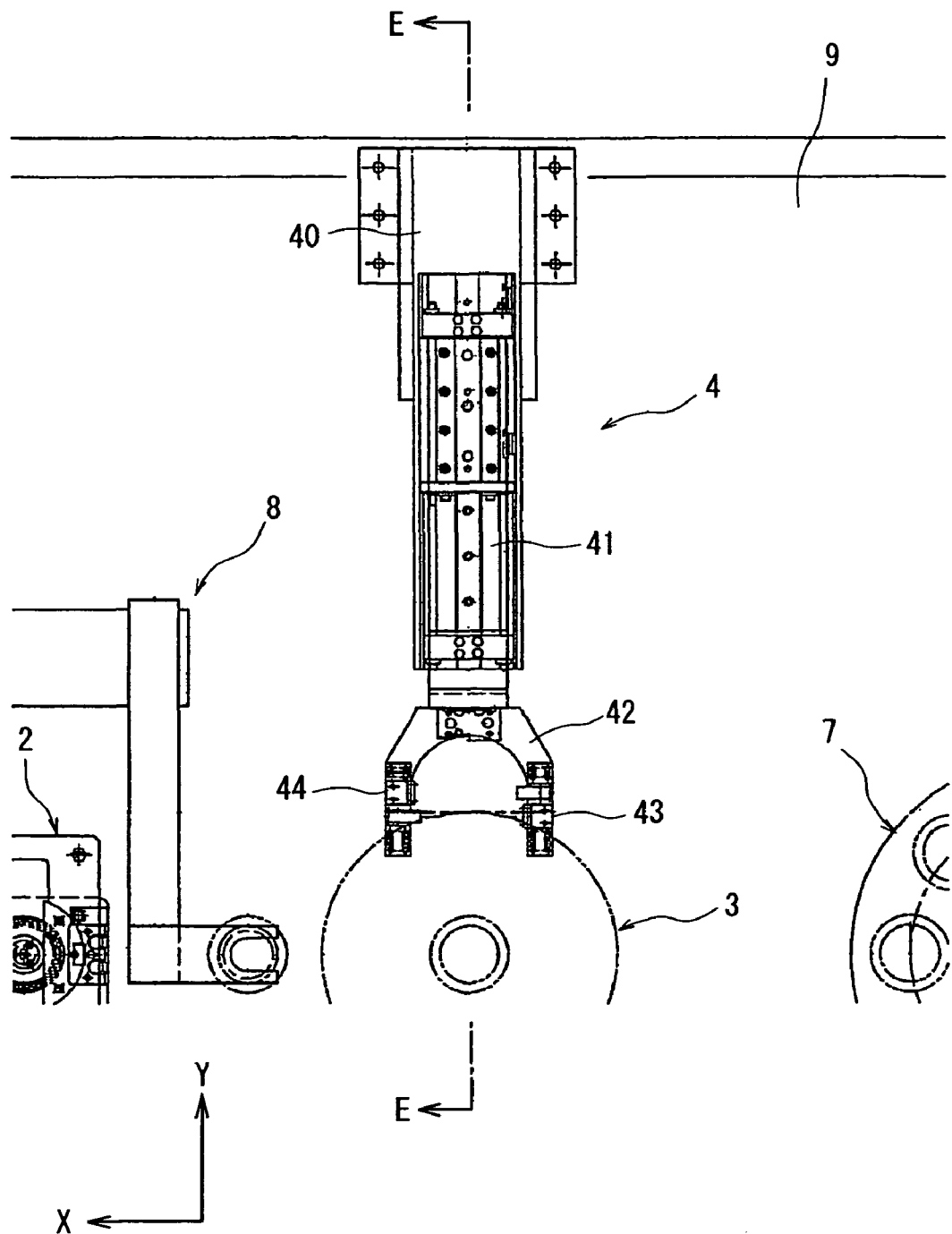
FIG. 11 is a plan view of a height measuring sensor provided in the coating apparatus of FIG. 1.
Figure 12:
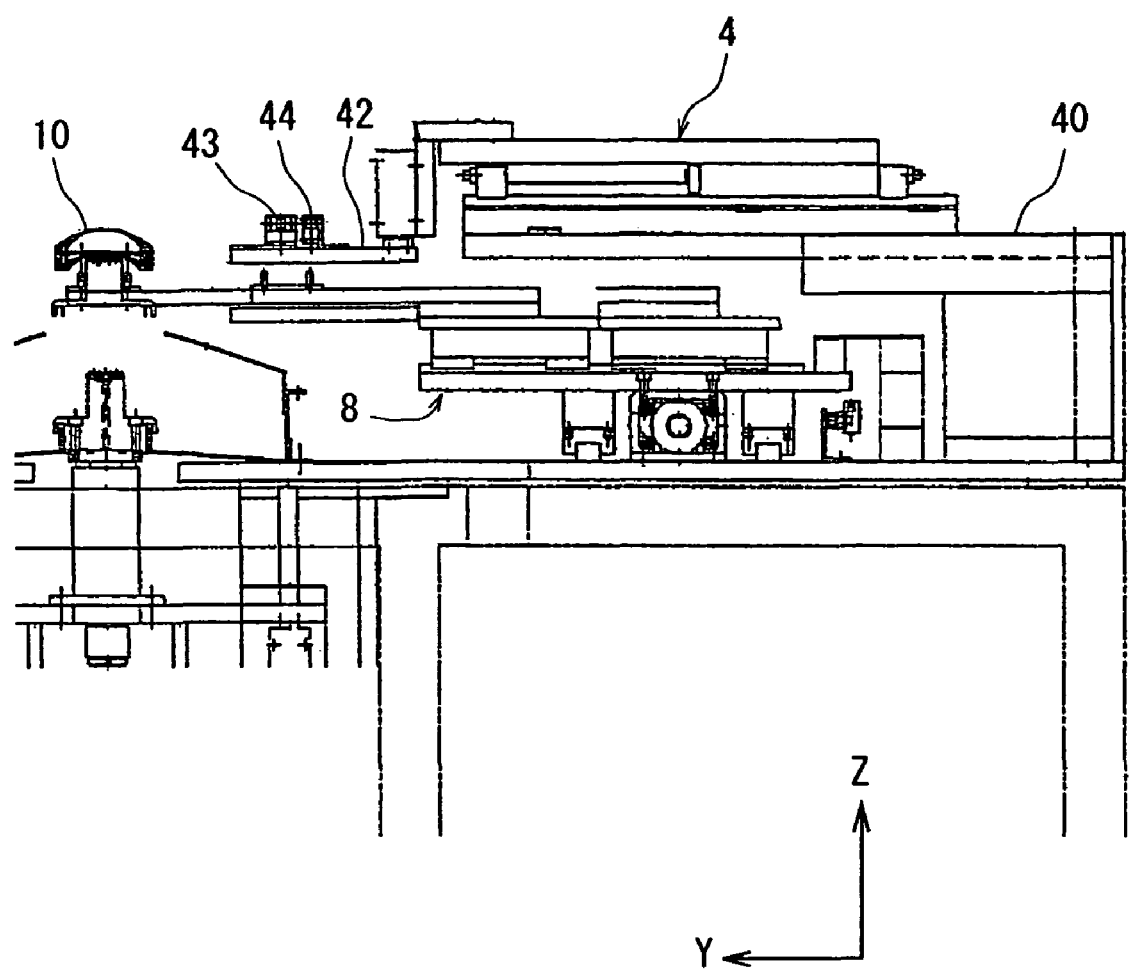
FIG. 12 is a sectional view taken on line E-E in FIG. 11.

FIGS. 11 and 12 show the lens height measuring sensor 4.

The lens height measuring sensor 4 is provided with a Y-axis slide block 41 disposed on the base stand 9, and the Y-axis slide block 41 extends from the rear side of the base stand 9 toward the spinning shaft 34 over the lens transport device 8. The Y-axis slide block 41 is provided with a Y-axis guide member 40 which can move on the Y-axis slide block 41 toward and away from the spinning shaft 34 in the Y-axis direction. A sensor-mounting member 42 of a U-shape is provided in a leading end portion of the Y-axis slide block 41, and two sensor units 43 and 44 are disposed in opposite side end portions of the sensor-mounting member 42 which confront each other. Sensors 43a, 44a of the sensor units 43, 44 each have a light emitting portion and a light receiving portion, and the light emitting portion throws laser light. Mirrors (photoreflectors) 43b, 44b reflect the laser light, and the receiving portions of the sensors 43a, 44a can receive the reflected laser light.

Figure 13:
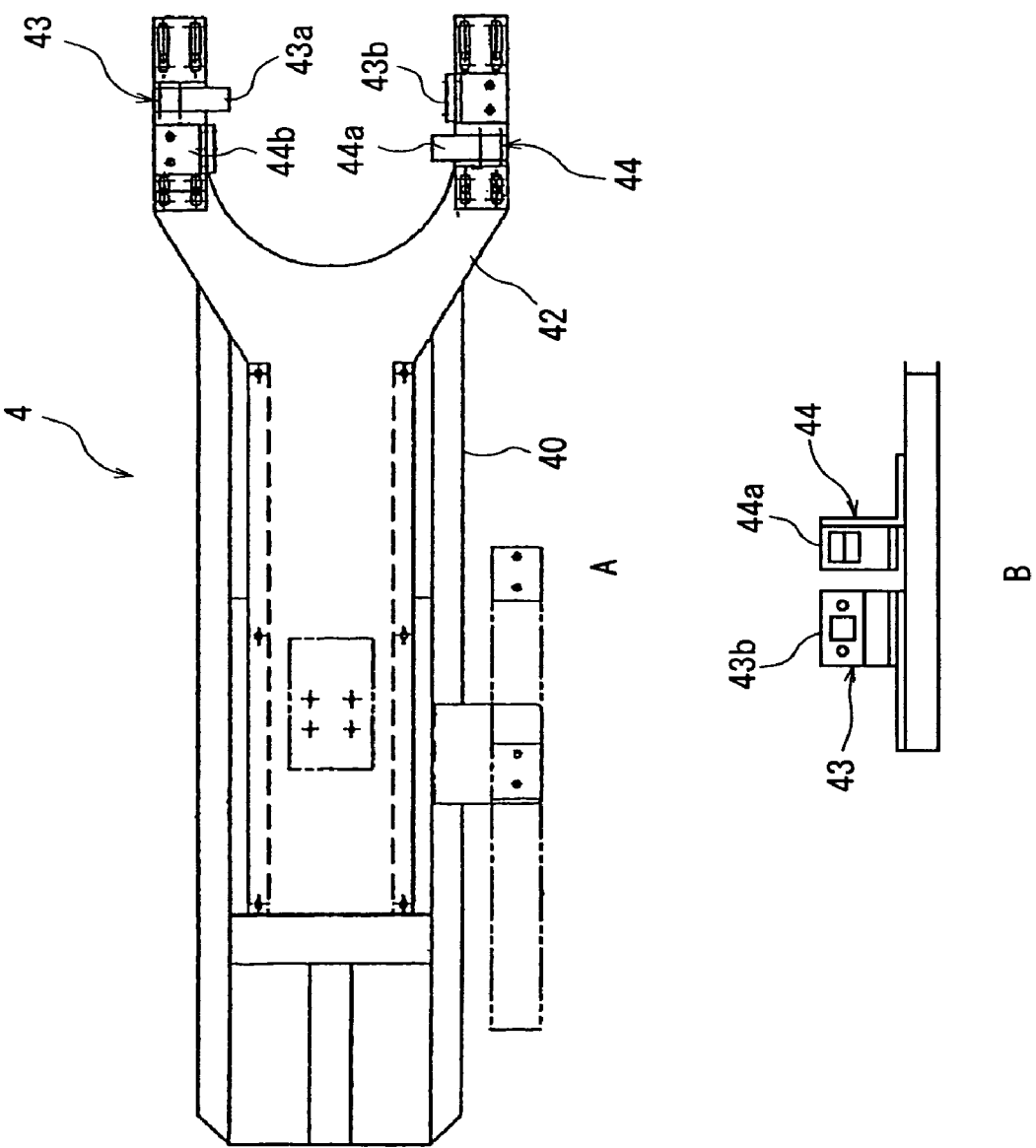
FIG. 13A is an enlarged plan view of a sensor body of the height measuring sensor of FIG. 1.
FIG. 13B is an enlarged side view of the sensor body.

As shown in FIGS. 13A and 13B, the sensor units 43, 44 comprise the sensors 43a, 44a and the mirrors 43b, 44b disposed to be staggered and opposed. A line connecting one sensor 43a and one mirror 43b, and a line connecting the other sensor 44a and the other mirror 44b are arranged at the same horizontal height position and in parallel. The lens 10 is placed between the sensors 43a, 44a and the mirrors 43b, 44b. The sensor units 43, 44 detect the presence or absence of the lens 10 and the reference height of the lens surface from the base stand 2 (FIGS. 22A to 22C) such that when the lens 10 is placed between the sensors 43a, 44a and the mirrors 43b, 44b, laser light is crooked by the lens 10 and thereby blocked.

Figure 14:
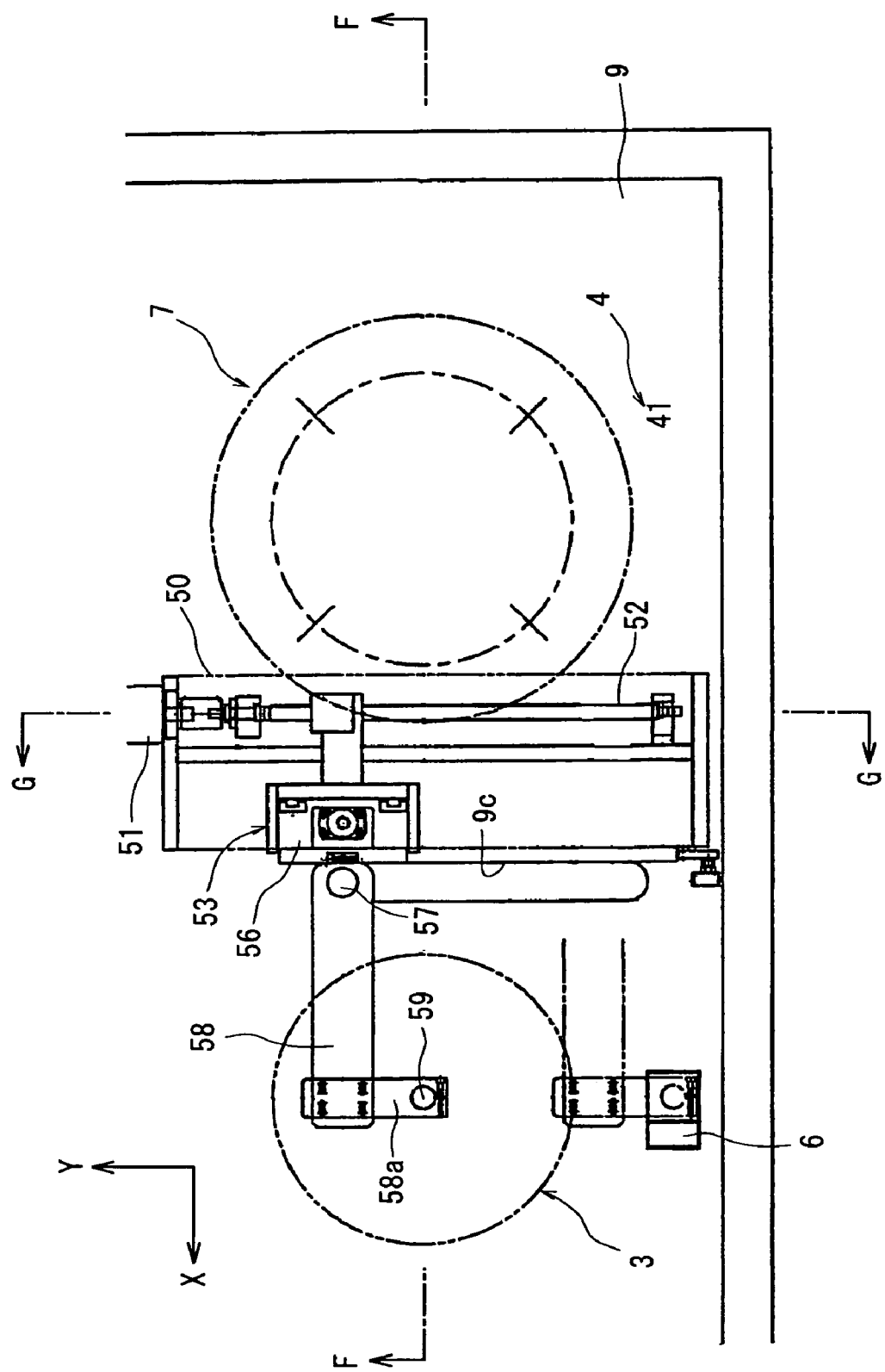
FIG. 14 is a plan view of an applicator device provided in the coating apparatus of FIG. 1.
Figure 15:
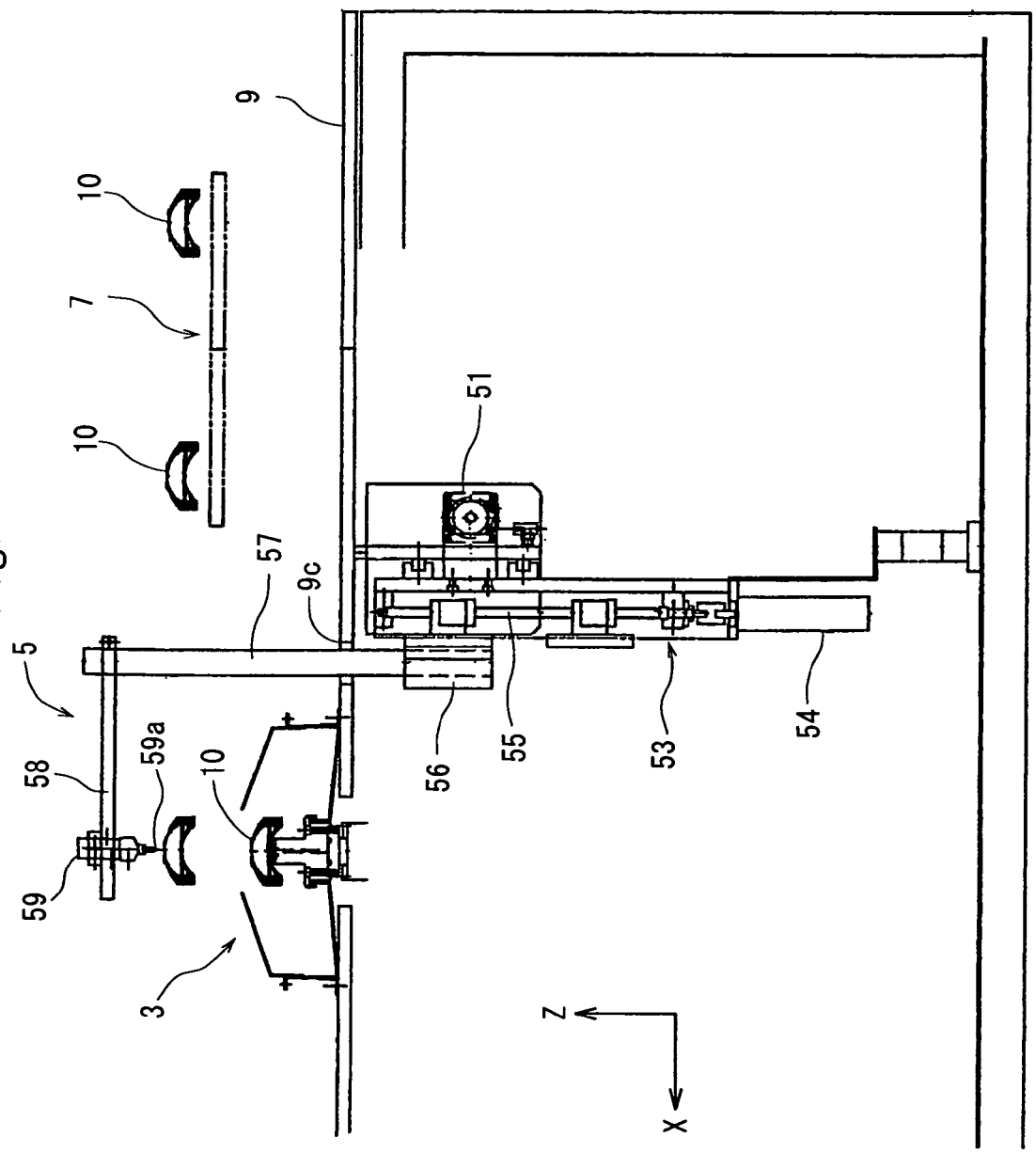
FIG. 15 is a sectional view taken on line F-F in FIG. 14.
Figure 16:
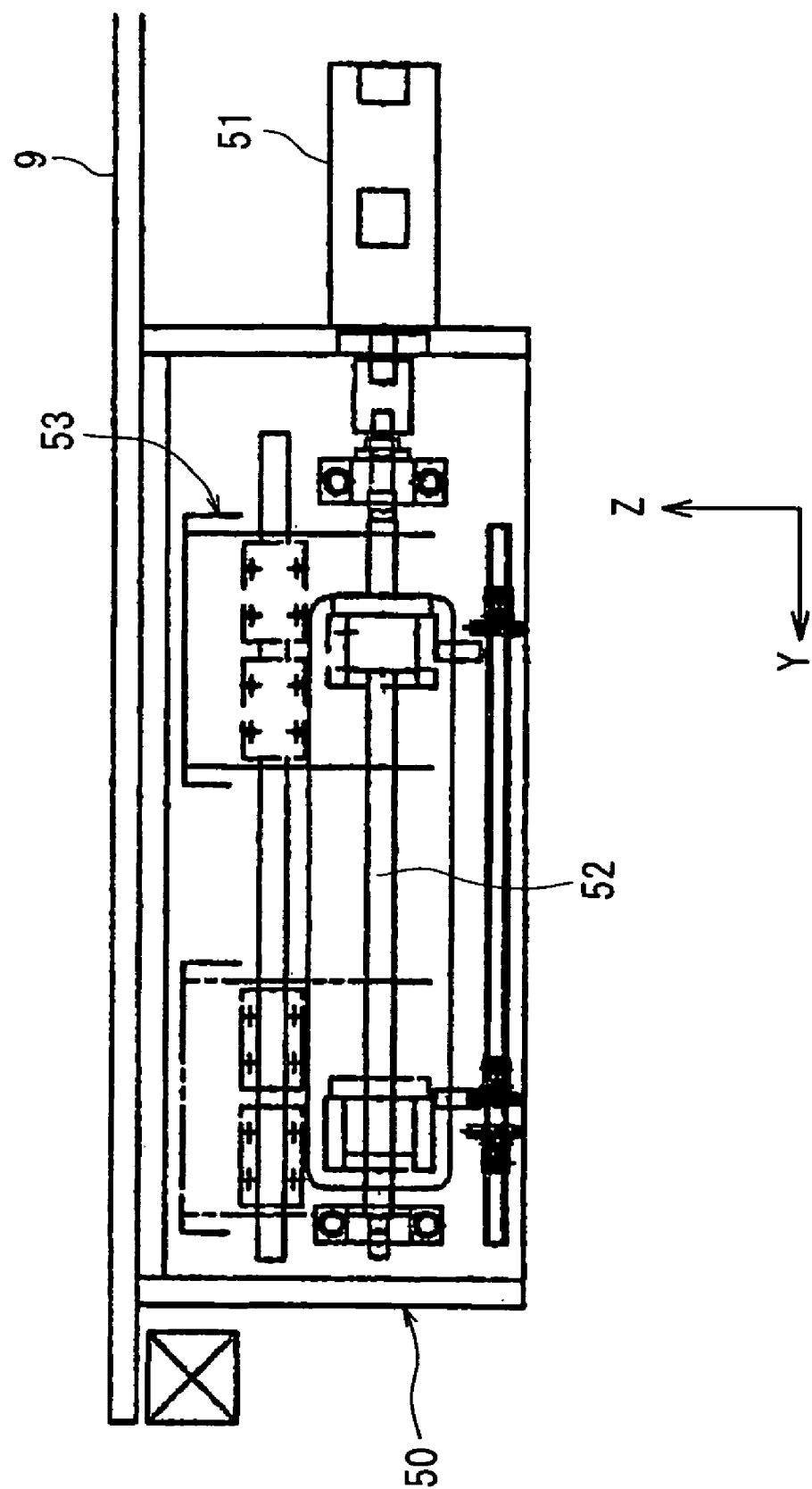
FIG. 16 is a sectional view taken on line G-G in FIG. 14.

FIGS. 14 to 16 show the applicator device 5 for coating the lens 10 with a primer coating fluid. As shown in these drawings, a Y-axis guide unit 50 extends in the Y-axis direction in a front portion of the ceiling surface of the base stand 9. The Y-axis guide unit 50 is screwed to a Y-axis ball screw 52 connected to a servo motor 51, and a slide unit 53 is mounted on the Y-axis ball screw 52. When the servo motor 51 is driven, the slide unit 53 can move forward and backward in the Y-axis direction.

The slide unit 53 is mounted with an elevating block 56 which is screwed to a Z-axis ball screw 55 connected to a servo motor 54 and extending in the up-and-down direction. When the servo motor 54 is driven, the elevating block 56 is moved upward and downward. The elevating block 56 is provided with a support rod 57 erected in the vertical direction. The support rod 57 passes vertically through a slot 9c formed in the base stand 9 along the Y-axis guide unit 50, and protrudes from inside the base stand 9 to above the base stand 9. In an upper portion of the support rod 57, a support arm 58 extending in the X-axis direction extends horizontally, and a support plate 58a facing the front side of the coating apparatus 1 is mounted on the leading end side of the support arm 58. A dispensing valve 59 is provided in a leading end portion of the support plate 58a, and a nozzle 59a for ejecting the coating fluid is mounted in a lower end portion of the dispensing valve 59, with the tip of the nozzle 59a facing directly below. The central position of the nozzle 59a, and the central position of the spinning shaft 34 of the spinning device 3 can be brought onto the same coordinate axis of the Y-axis.

Figure 17:
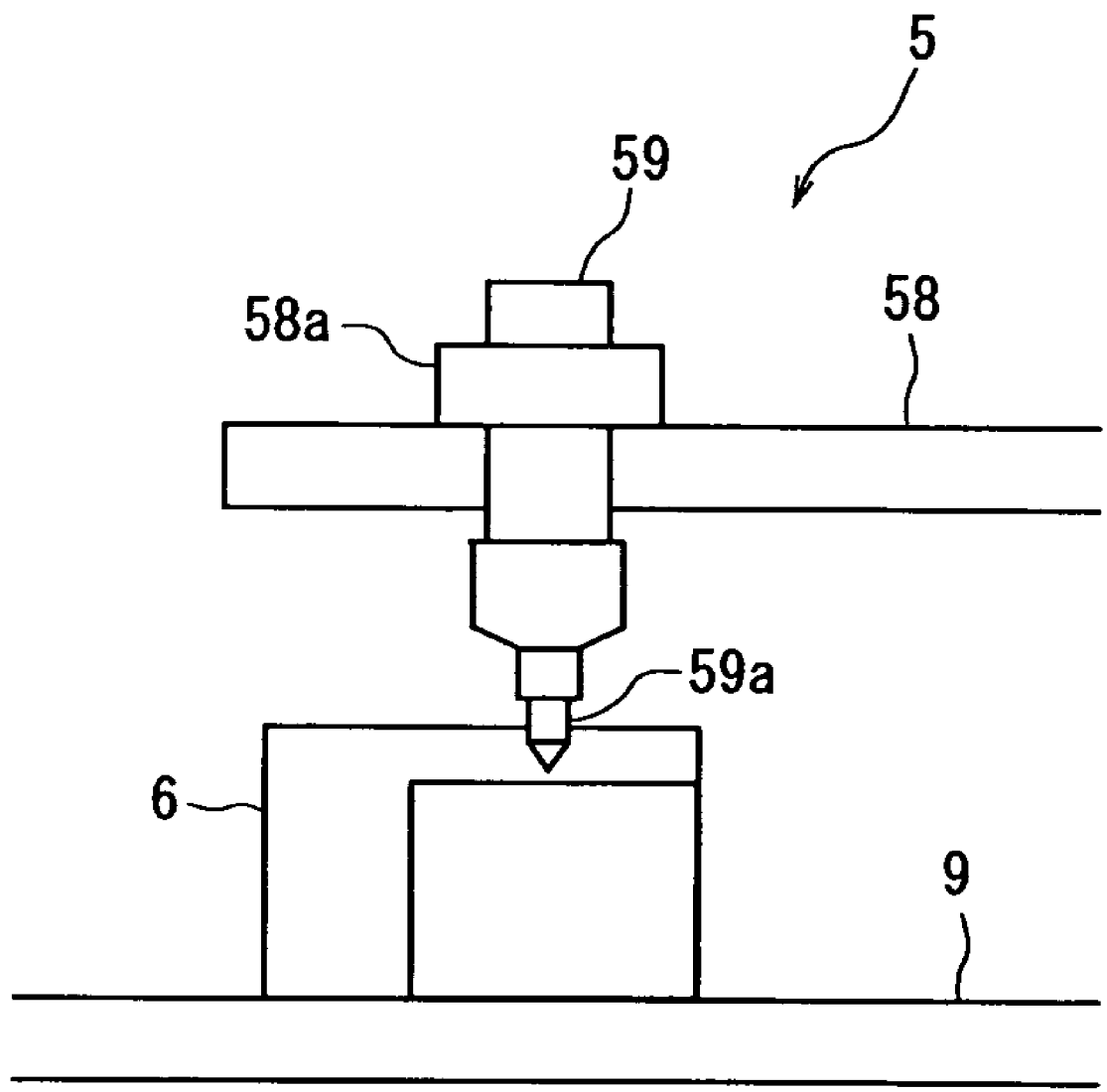
FIG. 17 is an enlarged sectional view of a waiting tank of a nozzle of a vessel of the coating apparatus of FIG. 1.

The nozzle waiting tank 6 for dipping the nozzle 59a of the dispensing valve 59 shown in FIGS. 14 and 17 is provided in the front portion of the base stand 9 of the coating apparatus 1, and a solvent is stored in the interior of the nozzle waiting tank 6. The position of the nozzle waiting tank 6 is set forward of the spinning shaft 34 (on the same Y-axis coordinates). When the applicator device 5 is not in operation, the tip of the nozzle 59a of the dispensing valve 59 is dipped in the solvent contained in the nozzle waiting tank 6. When the servo motor 54 is driven, the elevating block 56 is moved upward. In accordance with this upward movement, the dispensing valve 59 is moved upward. When the servo motor 51 of the Y-axis guide unit 50 is driven, the dispensing valve 59 is moved in the Y-axis direction to position the nozzle 59a directly above the center of the spinning shaft 34. Then, the servo motor 51 is driven again, whereby the height of the nozzle 59a can be adjusted to a height which is suitable for the lens 10 during coating with the coating fluid.

The interior of the nozzle waiting tank 6 is partitioned into two compartments, i.e., a solvent tank and an overflow tank. The nozzle waiting tank 6 is structured such that the solvent is supplied into the solvent tank, and a surplus of the solvent flows into the overflow tank to keep the height of the fluid level of the solvent in the solvent tank constant. The nozzle waiting tank 6 may have a fluid level sensor for detecting a decrease in the solvent, or a mechanism for supplementing the decreased solvent in the nozzle waiting tank 6 automatically.

Figure 18:
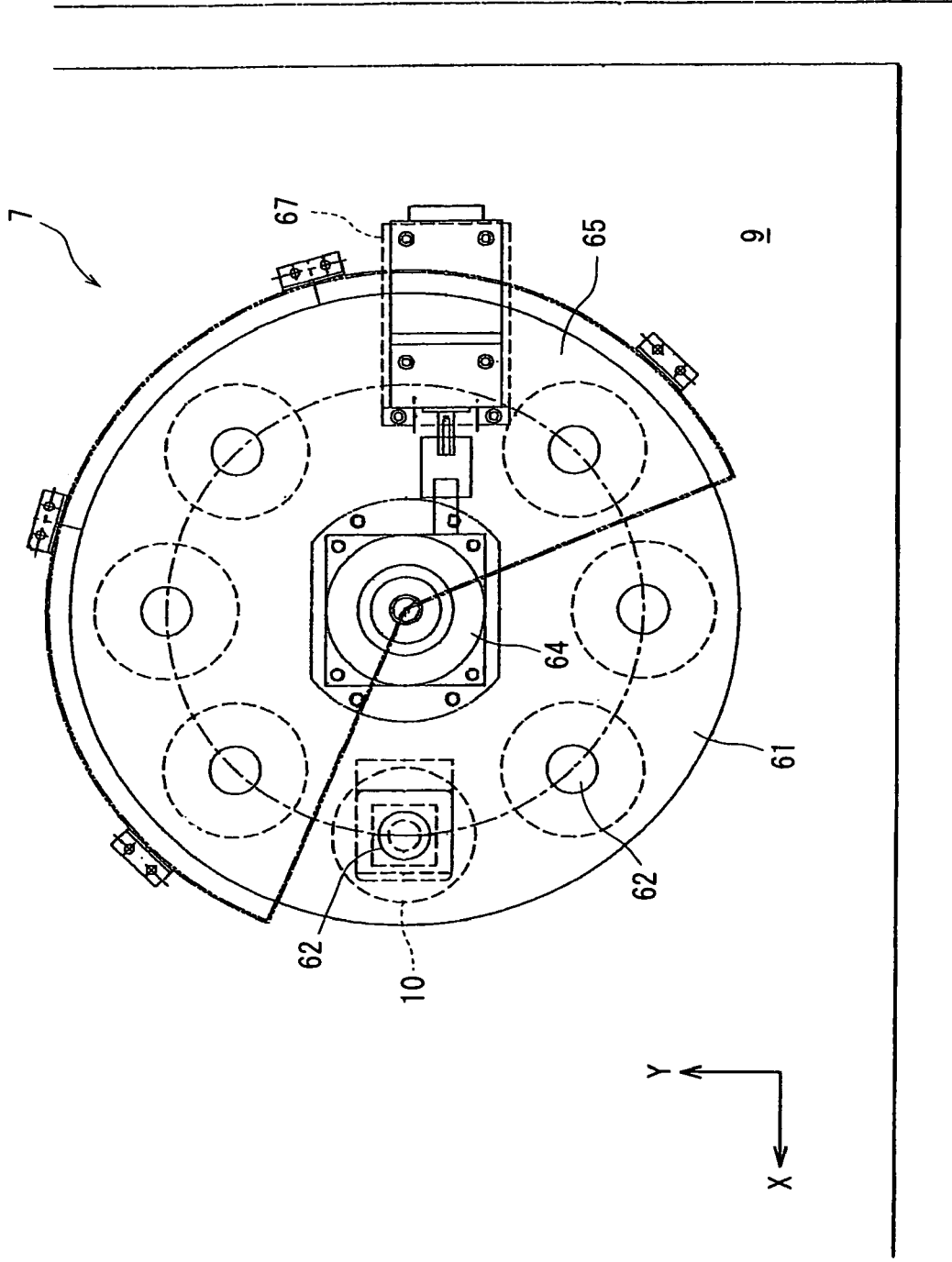
FIG. 18 is a plan view of a drying device of the coating apparatus of FIG. 1.
Figure 19:
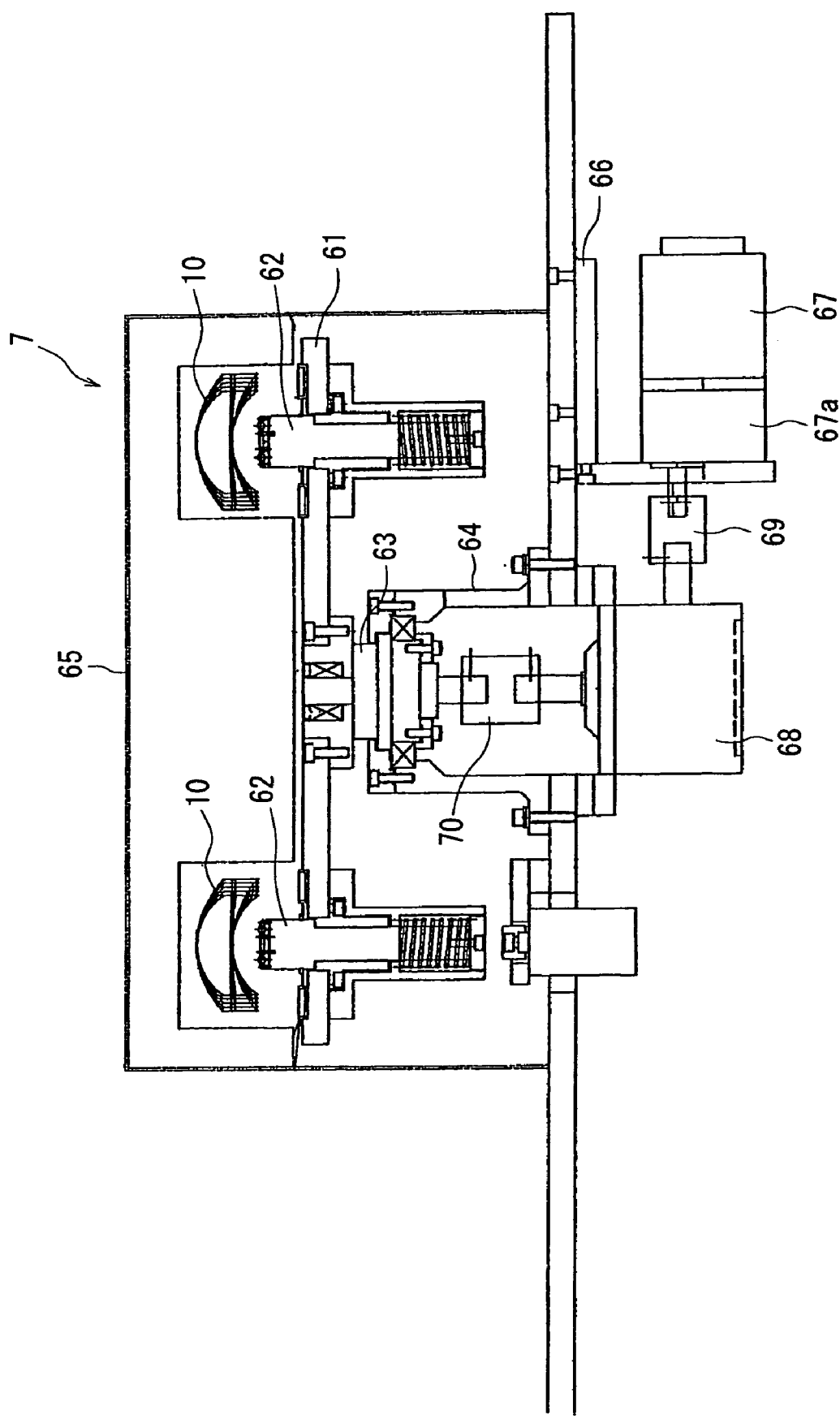
FIG. 19 is a sectional view of the drying device of the coating apparatus of FIG. 1.

The lens drying device 7, as shown in FIGS. 18 and 19, has a turntable 61 provided on the base stand 9, and the turntable 61 has a support shaft 63 rotatably supported by a support case 64 fixed to the base stand 9. Eight slide shafts 62 for supporting the lenses 10 are provided in the turntable 61, and the slide shafts 62 are arranged concentrically with the center of the support shaft 63. That is, the slide shafts 62 works as a lens support portion of the drying device 7. A part of the turntable 61 is covered with a fan-shaped cover 65.

A motor-supporting bracket 66 of an L-shaped cross section is fixed to the ceiling surface of the base stand 9, and a speed control motor 67 having a gear head 67a on its leading end side is mounted on the motor-supporting bracket 66. A gear box 68, which changes the direction of the axis of rotation from the horizontal direction to the vertical direction, is provided between the gear head 67a of the speed control motor 67 and the support shaft 63 of the turntable 61. Couplings 69 and 70 are interposed between the gear head 67a and the gear box 68, and between the support shaft 63 and the gear box 68, respectively, to connect them.

In the lens drying device 7, the turntable 61 is rotated by driving of the speed control motor 67 to rotate, sequentially, the coated lenses 10 supported on the support shaft 63.

Figure 20:
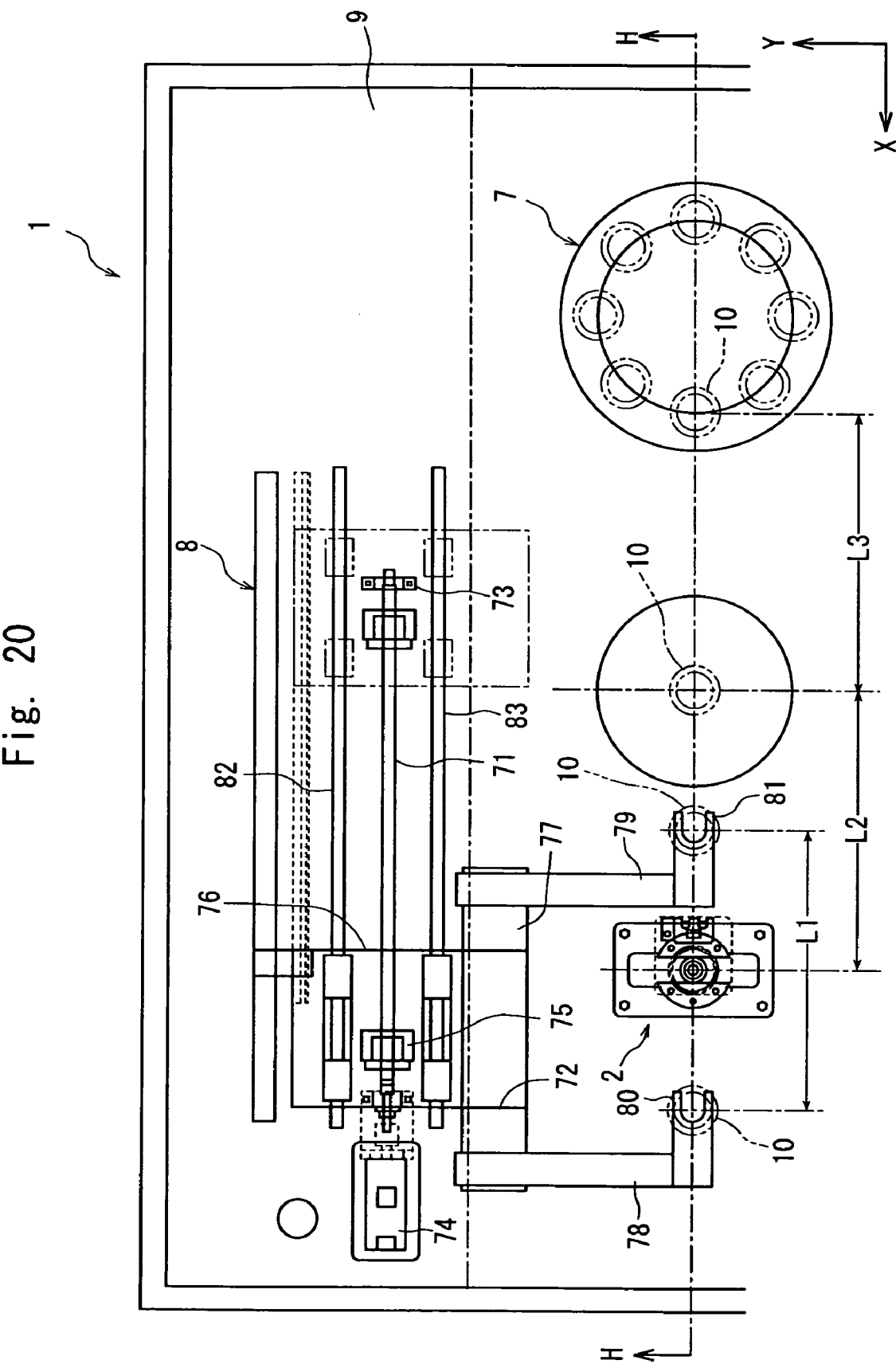
FIG. 20 is a sectional view of a lens transport device provided in the coating apparatus of FIG. 1.
Figure 21:
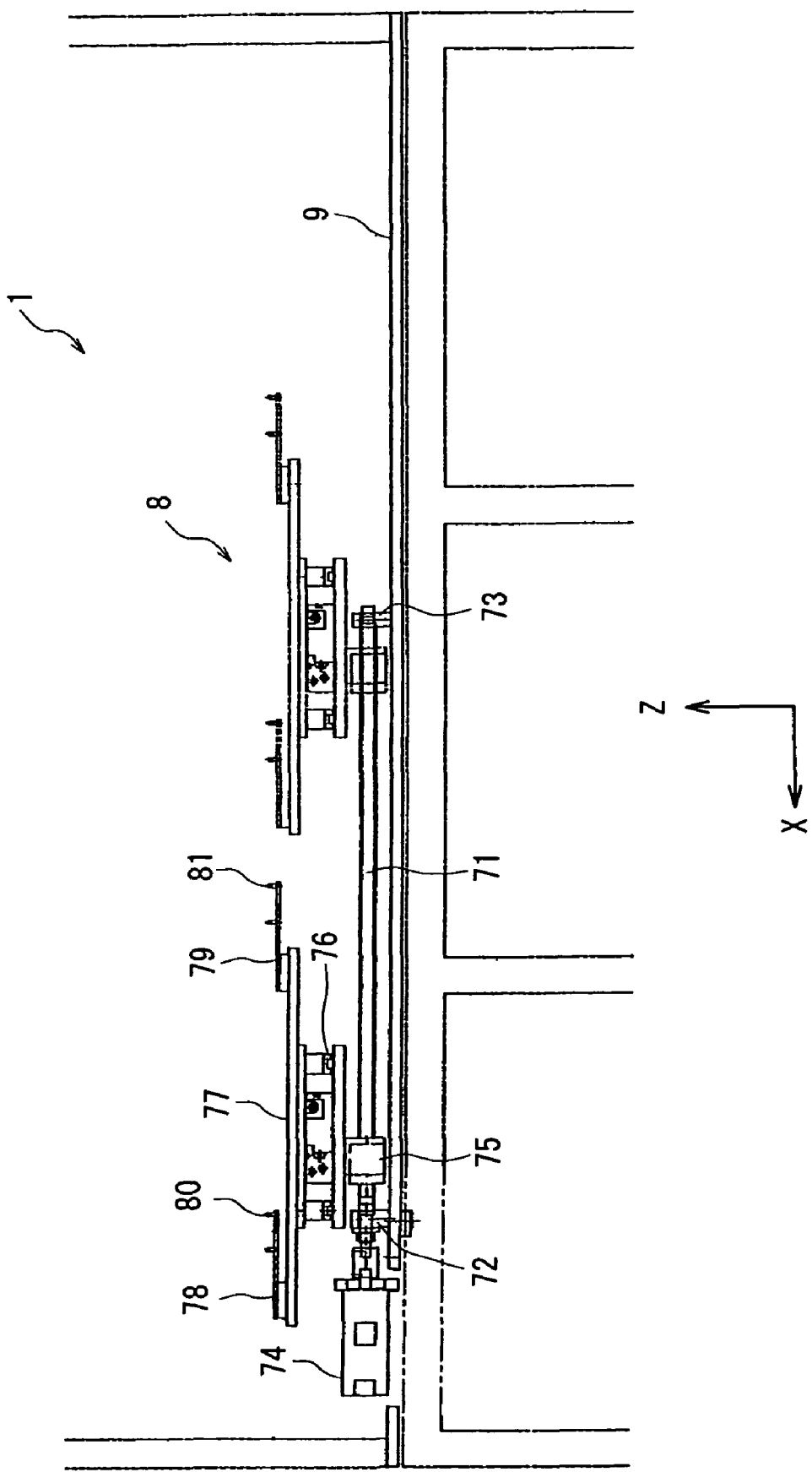
FIG. 21 is a sectional view taken on line H-H in FIG. 20.

FIGS. 20 and 21 show the lens transport device 8.

The lens transport device 8 has an X-axis ball screw 71 disposed on the base stand 9, with the X-axis ball screw 71 facing in the X-axis direction. Opposite end portions of the X-axis ball screw 71 are supported by bearings 72, 73 fixed on the base stand 9. An X-axis servo motor 74 is connected to an end portion of the X-axis ball screw 71, and an X-axis ball nut 75 is screwed to a threaded portion of the X-axis ball screw 71. A slider 76 is mounted on the X-axis ball nut 75. The slider 76 is guided by guide rails 82, 83 disposed parallel to the X-axis ball screw 71 on both sides of the X-axis ball screw 71. The slider 76 can be moved in the X-axis direction by driving the X-axis servo motor 74.

A support plate 77 extending in the X-axis direction is mounted on the front end side of the slider 76. L-shaped arms 78, 79, which extend toward the front side of the coating apparatus 1 and have leading end sides facing in the width direction of the coating apparatus 1, are provided in opposite end portions in the X-axis direction of the support plate 77. U-shaped lens holding portions 80, 81 are provided in leading end portions of the L-shaped arms 78, 79. The size of the leading end shape of the lens holding portions 80, 81 is such a size that the lens 10 can be placed there, and that the centering rod 18 of the centering device 2 (see FIG. 3), the spinning shaft 34 of the spinning device 3 (see FIG. 12), and the slide shaft 62 of the lens drying device 7 (see FIG. 19) can enter the inside of the U-shape.

The central position of the lens holding portions 80, 81 when holding the lens 10, the central position of the centering rod 18 of the centering device 2, the central position of the spinning shaft 34 of the spinning device 3, and the central position of the turntable 61 (support shaft 63) of the lens drying device 7 can be brought onto the same coordinate axis on the X-axis coordinate (on the same straight line).

A center-to-center distance L1 between the lens holding portions 80 and 81 is equated to a center-to-center distance L2 between the centering rod 18 of the centering device 2 and the spinning shaft 34 of the spinning device 3, and to a center-to-center distance L3 between the spinning shaft 34 and the slide shaft 62 (spinning shaft side) supporting the lens 10 in the turntable 61 of the lens drying device 7. Thus, the lens holding portion 80 can transport the lens 10 on the centering rod 18 to the spinning shaft 34, and simultaneously the lens holding portion 81 can transport the lens 10 on the spinning shaft 34 to the slide shaft 62.

The procedure for primer coating by the coating apparatus of the present embodiment will be described below.

A lens base material prepared from thiourethane resin, for example, is used as a base material, and cleaning of the lens 10 with an aqueous solution of an alkali or by ultrasonic cleaning is performed as pretreatment.

Then, work using the coating apparatus 1 is done. First, the lens 10 is set in the centering jig 11 of the centering device 2 shown in FIG. 4. The lens 10 is centered by being adapted for any of the stepped portions d1 to d5 corresponding to the dimension of the outer diameter of the lens 10. Setting of the lens 10 may be performed manually, or mechanically by a handling device.

The lens 10, which has finished centering, is raised in the following manner: As shown in FIG. 3, the air slide table 16 is raised by air pressure, whereby the centering rod 18 mounted thereon contacts the back of the lens 10 to lift the lens 10 to a position higher than the height of the lens holding portion 80 of the lens transport device 8 shown in FIG. 20. After the lens 10 is lifted, the lens holding portion 80 is inserted astride the shaft portion of the centering rod 18. From this state, the centering rod 18 is lowered, whereby the lens 10 is held on the lens holding portion 80.

The other lens holding portion 81 makes an idling motion without the lens 10, because the lens 10 is not placed on the spinning shaft 34 of the spinning device 3 in such an initial stage of operation.

Figure 7:
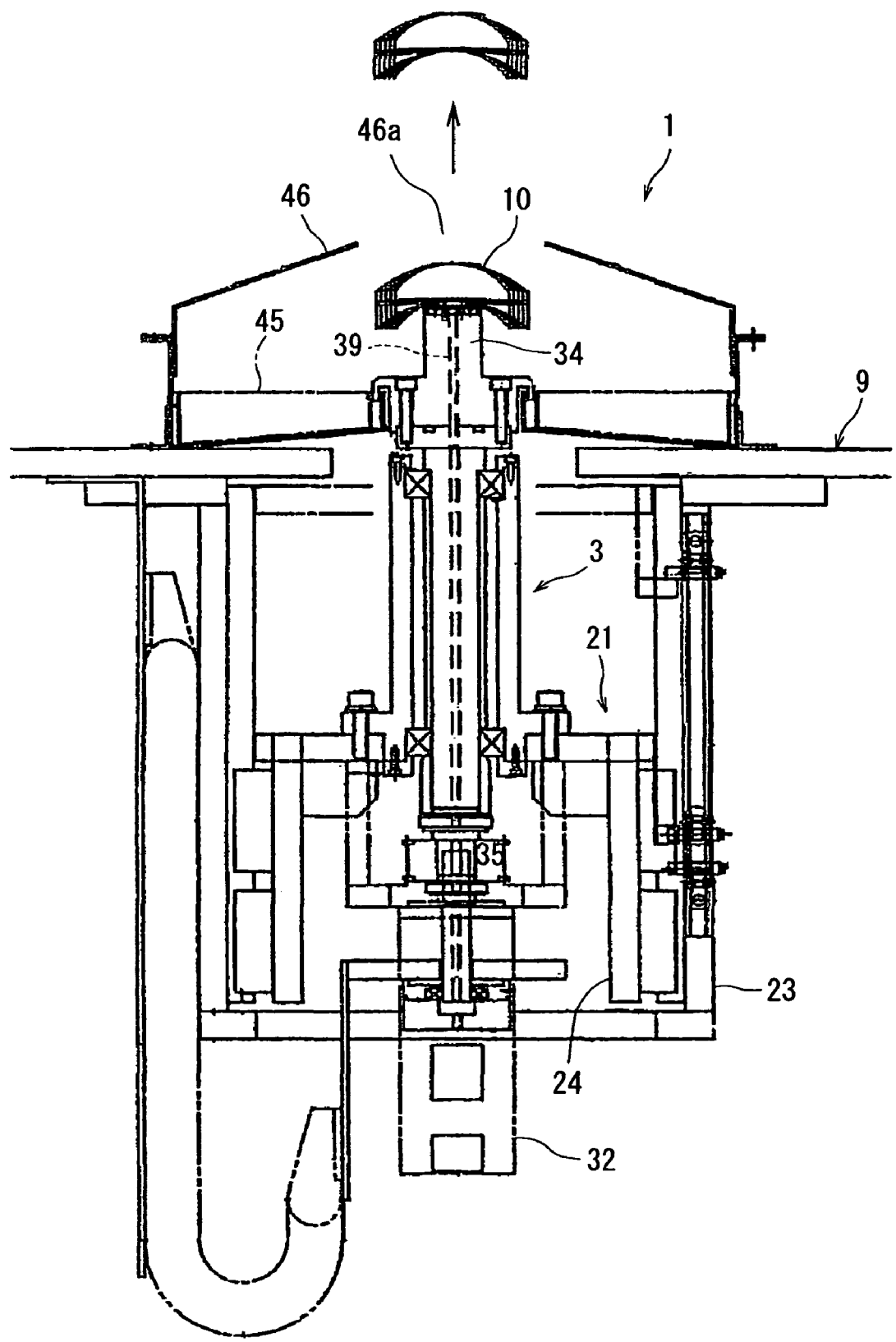
FIG. 7 is a sectional view taken on line D-D in FIG. 5.

Then, the lens 10 of the lens holding portion 80 is moved to directly above the spinning shaft 34 of the spinning device 3, as shown in FIG. 7, because the slider 76 is moved by driving of the X-axis servo motor 74 of the lens transport device 8. The servo motor 25 (see FIG. 6) is driven to raise the elevating block 24, thereby supporting the lens 10 on the upper end portion of the spinning shaft 34. The lens 10 is attracted and supported under negative pressure by suction through the attraction hole 39 (see FIG. 10) provided in the spinning shaft 34. The other lens holding portion 81, which has not held the lens 10, still makes an idling motion without the lens 10 on the slide shaft 62 of the lens drying device 7.

The lens 10 on the spinning shaft 34 is subjected to detection by the lens height measuring sensor 4, which detects the height of the lens 10, and a surface height difference h' between the center on the surface side of the lens 10 and the edge b of the lens 10 (the peripheral edge on the upper surface side of the lens), as shown in FIG. 22B. The height of the lens 10 is found in order to conform the lens 10 to the height of the nozzle 59a of the applicator device 5. The surface height difference h' of the lens 10 is detected in order to find the gradient of the lens 10, thereby determining a track along which the nozzle 59a is to be moved when the coating fluid is applied to the lens 10, and in order to determine the spinning conditions for the lens 10.

A detection operation is performed, with the lens 10 being held between the sensors 43a, 44a and the mirrors 43b, 44b of the sensor units 43, 44 of the lens height measuring sensor 4. That is, the servo motor 51 is driven to raise the spinning shaft 34 from a lower position. By so doing, laser light 43c from one sensor 43a located at the center position of the lens 10 is refracted by the lens 10. Since the laser light 43c does not reach the mirror 43b, or is refracted even when reaching the mirror 43b, the laser light 43c does not return to the sensor 43a. Thus, the presence of the lens 10 is detected. By measuring the center of the lens 10, the height of the lens 10 from the base stand 9 as a reference is found.

As shown in FIG. 22A, when the laser light from the sensor 43a is blocked, laser light 44c from the light emitting portion of the other sensor 44a returns to the sensor 43b via the mirror 44b, thus showing the absence of the lens 10. When the lens 10 is further raised, the laser light 44c hits the lens 10, and the laser light 44c is refracted thereby. As a result, the laser light 44c does not reach the mirror 44b, or does not return to the sensor 44a, thus leading to the recognition of the presence of the lens 10. In this manner, a surface height difference ho between the center position (vertex) of the lens 10 and an arbitrary position of the lens 10 other than the center is detected.

The surface height difference h' between the center of the lens 10 and the edge b of the lens 10 can be found by knowing the height of the center of the lens 10, and the surface height difference ho of the lens 10 detected by the other sensor unit 44.

That is, a knowledge of the distance between two points enables the surface height difference h' to be calculated from the following equation with reference to FIG. 22B:

$$R = \frac{h_0^2 + l^2}{2h_0}, \quad h' = R - \sqrt{R^2 - \frac{D^2}{4}} \quad \text{[Equation 1]}$$

where R denotes the radius of curvature of the upper surface of the lens, and D denotes the diameter of the lens 10.

Practically, the surface height difference h' can be calculated with the use of a simplified approximation expression such as the following equation:

$$h' = H_0 D^2 / 4L^2$$

In accordance with the magnitude of the radius of curvature R, i.e., the curvature of the lens 10, which has been calculated from the above equation, the rotational speed, the rotation time, etc. of the lens in the subsequent step are determined.

Then, a primer coating operation for the lens 10 is performed.

First of all, immediately before the primer coating operation by the nozzle 59a, a small amount of the coating fluid is ejected from the nozzle 59a, with the nozzle 59a being dipped in the nozzle waiting tank 6 (a non-target ejection operation). By this operation, the solvent which has slightly diffused and penetrated into the nozzle 59a during dipping of the nozzle 59a is discharged out of the nozzle, whereby the coating fluid which has become nonuniform because of contamination with the solvent can be prevented from being applied to the lens 10. The non-target ejection operation may be performed outside the nozzle waiting tank, as long as the outside site is a place where the coating fluid is not applied onto the lens 10.

A coating operation is performed in the following manner: The nozzle 59a is set at the center of the lens 10, and a distance h of 10 mm or less is provided with respect to a straight line drawn from the center c of the lens 10 shown in FIG. 22C to the edge b. The nozzle 59a is linearly moved parallel to the straight line in the radial direction of the lens 10 from directly above the center of the lens 10 to above the edge of the upper surface of the lens, with the distance h being kept. In making this motion, the slide unit 53 is moved toward the front side (in the Y-axis) of the coating apparatus 1 by the servo motor 51 of the applicator device 5. Then, the elevating block 56 is lowered by the servo motor 54 to move the leading end portion of the nozzle 59a parallel to the straight line connecting the center c to the edge b of the lens 10. Coating with the coating fluid is carried out, with the spinning shaft 34 being rotated by the servo motor 32.

With the lens 10 being rotated, the nozzle 59a is moved in the above manner and allowed to eject the coating fluid. By so doing, the nozzle 59a can move while forming a spiral locus over the lens 10, with the distance between the nozzle 59a and the lens 10 being kept at 10 mm or less. At this time, the coating fluid ejected onto the lens 10 can spread on the surface of the lens, in such a manner as to fill in the gaps of the coating, by the force of the ejection and the centrifugal force of the lens, so that the coating fluid can be applied, without fail, to the entire upper surface of the lens 10. If the distance between the lens 10 and the nozzle 59a is too large (for example, 20 mm or more) when the coating fluid is applied, the coating fluid ejected through the nozzle 59a drops as droplets by its own surface tension before reaching the surface of the lens 10. As a result, uncoated portions may be left in the coating, or air bubbles may be incorporated into the coating. In the present invention, the height and gradient of the lens 10 are determined by measurements, whereby even if the shape of the lens 10 changes, coating can take place such that the nozzle and the lens are kept at a certain distance or less. Thus, the above problems can be avoided.

The rotational speed of the lens 10 during application of the coating fluid may be selected to be appropriate, in consideration of the viscosity and drying speed of the coating fluid, so that a uniform coating film is obtained. The moving speed of the nozzle may be selected to be appropriate, in consideration of the balance between the rotational speed of the lens 10 and the ejection speed of the coating fluid, so that the entire upper surface of the lens 10 can be coated without uncoated spots. The preferred rotational speed of the lens 10 during coating with the primer solution is 50 to 100 rpm, and the moving speed of the nozzle 59a is 1.5 to 4 mm/second.

After the coating fluid is applied, the rotational speed of the lens 10 is increased to thin the coating film and adjust the film thickness. Concretely, the lens 10 is rotated for 5 seconds or so at a rotational speed of 600 to 1,500 rpm. The thickness of the coating layer is 7 μm. The rate of increase and the rotational speed when the rotational speed is increased are varied according to the curvature of the lens 10 or the ambient temperature for the lens 10, and are adjusted to attain a proper film thickness.

After completion of the coating operation, the elevating block 56 of the applicator device 5 is lowered by the servo motor 54 to dip the tip of the nozzle 59a in the coating fluid contained in the nozzle waiting tank 6. During the coating operation for the lens 10, the lens holding portions 80, 81 are returned to the initial position shown in FIG. 20 and, in the centering jig 11 of the centering device 2, the lens 10 is set at the stepped portion d. In a next operation, one lens holding portion 80 holds the lens 10 placed on the centering rod 18, as stated earlier, and the same operation is repeated to transport the lens 10 to the spinning shaft 34. While the one lens holding portion 80 is holding the lens 10, the other lens holding portion 81 is placed around the spinning shaft 34, and the spinning shaft 34 is lowered, whereby the other lens holding portion 81 holds the coating fluid-coated lens 10 placed on the spinning shaft 34.

When the one lens holding portion 80 transports the lens 10 to the spinning shaft 34, the lens 10 on the other lens holding portion 81 is simultaneously placed directly above the slide shaft 62 of the lens drying device 7. The slide shaft 62 protrudes upward, so that the lens 10 is held by the slide shaft 62.

In the lens drying device 7, the turntable 61 is rotated for drying. After the lens 10 is provided with the coating layer, the coating layer is dried (solidified) for 15 minutes at room temperature. The coating fluid comprising a urethane primer has the property of becoming solid when exposed to moisture. The turntable 61 is rotated through one turn, and the lens 10 having the coating layer solidified is withdrawn from the drying device.

As noted above, the one lens holding portion 80 transports the centered lens 10 from the centering rod 18 of the centering device 2 to the spinning shaft 34 of the spinning device 3. At the same time, the other lens holding portion 81 transports the coated lens 10 from the spinning shaft 34 to the slide shaft 62 of the lens drying device 7. The coating apparatus 1 sequentially repeats this operation, and moves the lenses 10 simultaneously. Thus, compared with an apparatus having only one lens holding portion, the coating apparatus 1 can carry out operation while shortening the operating time and moving the lens holding portions to a minimum necessary degree, thus achieving both the decrease in the working time and the reduction of the manufacturing cost.

In the lens drying device 7, after the coating layer of the lens 10 is solidified, the lens 10 is withdrawn from the lens drying device 7. The lens 10 withdrawn from the lens drying device 7 is subjected to photochromic coating in a next step.

The embodiment of the present invention has been described above, but needless to say, various modifications or changes of the present invention are possible based on the technical ideas of the present invention.

Figure 23:
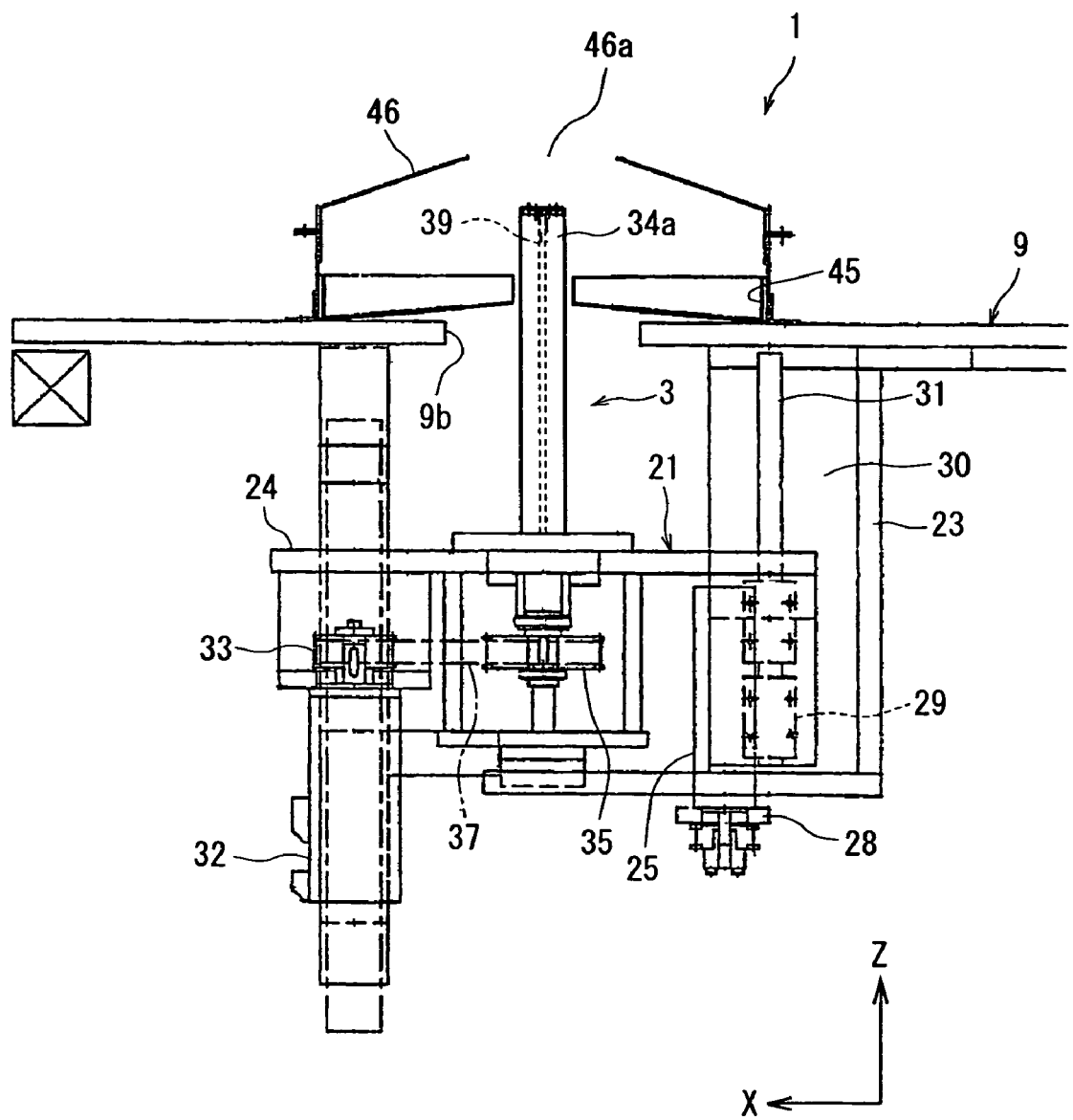
FIG. 23 is a sectional view of a portion corresponding to FIG. 6, showing a modification of the spinning device in the coating apparatus according to the present embodiment.

As shown in FIG. 6, the spinning shaft 34 has a larger diameter on the base end side than on the leading end side. However, as shown in FIG. 23, the diameter of the spinning shaft 34a remains the same in the range from the base end side up to the leading end side, like the diameter of the spinning shaft 34a of the spinning device 3.

If the coating fluid being coated flows down the lens 10 and adheres to the spin 34, the coating fluid becomes semisolid. The viscous coating fluid on the spinning shaft 34 may levitate in a thread-like form and adhere to the lens 10 upon rotation of the spinning shaft 34. As a means for preventing this, the spinning shaft 34 is given a sufficiently smaller diameter than the diameter of the lens 10, so that the coating fluid, even if falling from the lens 10, can be prevented from adhering to the spinning shaft 34. Concretely, the diameter of the spinning shaft 34 is preferably smaller than the diameter of the lens by 15 mm or more at the rotational speed of the spinning shaft 34 within the range described in the above embodiment.

In connection with the sensor units 43, 44, the line connecting the sensor 43a and the mirror 43b is located at the same horizontal height as the line connecting the other sensor 44a and the other mirror 44b, but one of the sensors may be located at a different height position to provide a height difference between the two sensors. In this case, the edge position of the lens 10 is determined in consideration of the height difference between the sensors.

According to the embodiment of the present invention, coating with the primer solution is taken as an example. However, the present invention can be applied to other coating.

In connection with the sensor units 43, 44, the two sensors are used, but it is possible to use only one sensor, change the sensor position, and detect the height positions of the central portion and other point of the lens, thereby performing detection. However, this procedure takes time.

As described above, in the coating apparatus as the first aspect of the present invention, the respective lens support portions of the centering device, the spinning device, and the drying device are arranged at equal distances; a pair of the lens holding portions of the lens transport device are provided at the same distance as the distance between the respective lens support portions; the first of the lens holding portions transports the lens from the lens support portion of the centering device to the lens support portion of the spinning device; and the second of the lens holding portions simultaneously transports the lens from the lens support portion of the spinning device to the lens support portion of the drying device. Thus, the wasteful movement of the lens transport device can be prevented, and the lens transport time can be shortened.

In the coating apparatus, as the second aspect of the present invention, the lens height measuring sensor is provided for detecting by the sensor a lens height difference between two points at the center of the lens surface of the lens supported by the spinning device and at other location on the lens surface spaced from the center. Thus, operation can be performed without prior knowledge of the height or gradient of the lens. Hence, the coating operation can be smoothed.

In the coating apparatus, as the third aspect of the present invention, the lens height measuring sensor is equipped with the two sets of light emitters and light receivers, and determines the height of the lens by allowing the lens to block light emitted from the light emitter and reaching the light receiver. Thus, the shape and size of the lens can be measured by a single measuring operation.

In the coating apparatus, as the fourth aspect of the present invention, the coating fluid is coated onto the surface of the rotating lens while the nozzle is being moved at a distance from, and along, a straight line connecting the center of the surface of the lens to an edge portion of the surface of the lens. Thus, the coating fluid can be uniformly coated onto the surface of the lens.

In the coating apparatus, as the fifth aspect of the present invention, the drying device is the turntable rotatable about the axis of rotation, and a plurality of the lens support portions of the drying device are provided on the turntable to dry a plurality of the lenses. Thus, the lenses can be dried sequentially, achieving efficient drying of the lenses.

In the coating apparatus, as the sixth aspect of the present invention, the waiting tank storing a solvent is provided for the nozzle, and the tip of the nozzle is dipped in the waiting tank when the applicator device is not in operation. Thus, the tip of the nozzle can be prevented from drying, and the coating fluid can be supplied stably.

In the coating apparatus, as the seventh aspect of the present invention, an operation for applying the coating fluid onto the lens is a primer coating operation to be performed before photochromic coating of the lens. Thus, preferred primer coating can be performed.

What we claim is:

1. A coating apparatus for a lens, comprising:
   a centering device for determining a center of a lens;
   a spinning device for rotating a lens;
   an applicator device comprising a nozzle for discharging a coating fluid for applying the coating fluid onto the surface of the lens held at the spinning device;
   a drying device for drying the coating fluid on the surface of the lens; and
   a lens transport device for transporting the lens from the centering device to the spinning device, and further transporting the lens from the spinning device to the drying device, wherein
   each of the centering device and the spinning device has a lens support portion, the drying device has plural of lens support portions, the lens transport device has a pair of lens support portions;
   the lens support portion of the centering device, the lens support portion of the spinning device, one of lens support portions of the drying device, and a pair of lens support portions of the lens transport device are arranged such that these all lens support portions are being located on an identical line and also that the distance between a pair of lens holding portions of the transport device, the distance between the lens support portion of the centering device and the lens support portion of the spinning device, and the distance between the lens support portion of the spinning device and the lens support portion of the drying device are being the same;

a first lens support portion of the transport device transports the lens from the lens support portion of the centering device to the lens support portion of the spinning device; and a second lens support portion of the transport device simultaneously transports the lens from the lens support portion of the spinning device to the lens support portion of the drying device.

2. The coating apparatus according to claim 1, which further comprising a lens height measuring sensor for detecting a height difference between a height at the center of the lens and a height at other point on the lens surface spaced from the center.

3. The coating apparatus according to claim 2, wherein the lens height measuring sensor is equipped with two sets of light emitters and light receivers, and determines a height of the lens by allowing the lens to block light emitted from the light emitter and reaching the light receiver.

4. The coating apparatus according to claim 1, wherein the nozzle of the applicator device is being moved at a distance from, and along, a straight line connecting the center of the surface of the lens to an edge portion of the surface of the lens.

5. The coating apparatus according to claim 1, wherein the drying device comprises a turntable rotatable on an axis of rotation, and a plurality of the lens support portions of the drying device are provided on the turntable to dry a plurality of the lenses.

6. The coating apparatus according to claim 1, which further comprising a waiting tank storing a solvent to dip a tip of the nozzle when the applicator device is not in operation.

7. The coating apparatus according to claim 1, wherein the coating apparatus is used for primer coating as a pretreatment of photochromic coating of the lens.

* * * * *